US012568180B2

(12) United States Patent
Hosangadi et al.

(10) Patent No.: US 12,568,180 B2
(45) Date of Patent: Mar. 3, 2026

(54) APPARATUS, METHOD, AND SYSTEM FOR A PRIVACY MASK FOR VIDEO STREAMS

(71) Applicant: Nokia Technologies Oy, Espoo (FI)

(72) Inventors: Gurudutt Hosangadi, Hackettstown, NJ (US); Ming Lu, Hillsborough, NJ (US)

(73) Assignee: Nokia Technologies Oy, Espoo (FI)

( * ) Notice: Subject to any disclaimer, the term of this patent is extended or adjusted under 35 U.S.C. 154(b) by 506 days.

(21) Appl. No.: 17/820,933

(22) Filed: Aug. 19, 2022

(65) Prior Publication Data

US 2024/0064266 A1    Feb. 22, 2024

(51) Int. Cl.
| *H04N 5/272* | (2006.01) |
| *G06V 20/40* | (2022.01) |
| *G06V 20/52* | (2022.01) |

(52) U.S. Cl.
CPC ............. *H04N 5/272* (2013.01); *G06V 20/41* (2022.01); *G06V 20/52* (2022.01)

(58) Field of Classification Search
CPC ........ H04N 5/272; H04N 7/188; G06V 20/41; G06V 20/52; G06V 10/255; G08B 13/19686
See application file for complete search history.

(56) References Cited

U.S. PATENT DOCUMENTS

| 8,212,872 B2 | 7/2012 | Sablak |
| 10,535,143 B2 | 1/2020 | Matsumoto et al. |

| 10,991,397 B2 | 4/2021 | Michaud et al. | |
| 11,153,534 B2 | 10/2021 | Sablak et al. | |
| 2011/0150327 A1* | 6/2011 | Yoo .......................... | G06T 11/60 |
| | | | 382/165 |

(Continued)

FOREIGN PATENT DOCUMENTS

| EP | 4213120 A1 * | 7/2023 | ............. G06F 21/32 |
| EP | 4274268 A2 * | 11/2023 | ............. G06F 16/73 |
| KR | 20210006632 A * | 1/2021 | |

OTHER PUBLICATIONS

"Luis, Color image ownership protection based on spectral domain watermarking using QR codes and QIM, 2017, Springer Science + Business Media" (Year: 2017).*

(Continued)

*Primary Examiner* — Oneal R Mistry
*Assistant Examiner* — Justin Philip Cascais
(74) *Attorney, Agent, or Firm* — DITTHAVONG, STEINER, & MLOTKOWSKI

(57)    ABSTRACT

An approach for providing a privacy mask for video streams. The approach involves, for example, processing one or more images of a video stream to detect at least one object. The approach also determines one or more feature vectors from a plurality of pixels of the one or more images that correspond to the at least one detected object. The approach further involves encoding the one or more feature vectors into at least one mask that obscures the at least one object in the one or more images. The at least one mask is trackable across the one or more images of the video stream based on the one or more feature vectors. The approach further involves causing an addition of the at least one mask to the one or more images of the video stream and providing the video stream with the at least one mask as an output.

9 Claims, 20 Drawing Sheets

(56) References Cited

U.S. PATENT DOCUMENTS

2021/0392116 A1* 12/2021 Hsu ..................... H04N 21/235
2022/0189036 A1 6/2022 Park

OTHER PUBLICATIONS

"Hao, etc., Robustness Analysis of Face Obscuration, 2019, arXiv" (Year: 2019).*
"ONVIF", Wikipedia, Retrieved on Sep. 1, 2022, Webpage available at : https://en.wikipedia.org/wiki/ONVIF.
"Panasonic People Masking Technology", i-PRO, Retrieved on Sep. 1, 2022, Webpage available at : https://i-pro.com/eu/en/surveillance/technologies/people-masking-technology.
"Privacy in video surveillance", Axis Communications, Retrieved on Sep. 1, 2022, Webpage available at : https://www.axis.com/solutions-by-application/privacy-in-video-surveillance.
"Amazon Rekognition FAQs", AWS, Retrieved on Sep. 1, 2022, Webpage available at : https://aws.amazon.com/rekognition/faqs/.
Gao et al., "The Invisible QR Code", Proceedings of the 23rd ACM international conference on Multimedia, Oct. 2015, pp. 1047-1050.
Bandyopadhyay et al., "A fragile color image watermarking framework focusing a new invisible domain", Proceedings of the 2011 International Conference on Communication, Computing & Security, Feb. 2011, pp. 172-177.
Patvardhan et al., "Effective Color image watermarking scheme using YCbCr color space and QR code", Multimedia Tools and Applications, 2017, 23 pages.
Rosales-Roldan et al., "Color image ownership protection based on spectral domain watermarking using QR codes and QIM", Multimedia Tools and Applications, 2017, 22 pages.
"Mask R-CNN with OpenCV", PylmageSearch, Retrieved on Sep. 1, 2022, Webpage available at : https://pyimagesearch.com/2018/11/19/mask-r-cnn-with-opencv/.
Extended European Search Report received for corresponding European Patent Application No. 23189419.7, dated Dec. 13, 2023, 8 pages.

* cited by examiner

100

300

301 — PROCESS IMAGES TO DETECT OBJECT

303 — DETERMINE FEATURE VECTORS FROM PIXELS CORRESPONDING TO DETECTED OBJECTS

305 — ENCODE FEATURE VECTORS INTO TRACKABLE PRIVACY MASK

307 — ADD MASK TO IMAGES OF VIDEO STREAM

309 — PROVIDE VIDEO STREAM WITH MASKED IMAGES AS OUTPUT

500

GET $B_i, F_i$
FOR IMAGE $I$

501

GET
$x_{min,i}, y_{min,i}, x_{max,i}, y_{max,i}$
FROM $B_i$

503

CREATE ARRAY $A_i$
OF SIZE
$(x_{min,i} - y_{min,i}) \times (x_{max,i} - y_{max,i})$

505

POPULATE $A_I$
COLUMNWISE OR ROWWISE WITH ELEMENTS OF
$F_I$
AND REPEAT UNTIL MATRIX IS FULLY
POPULATED. THIS IS
$M_I$

507

MORE
$B_i$
?

509

YES

NO

STOP

600

GET $B_i, M_i$

601

GENERATE PN SEQUENCE $Q$ WHOSE LENGTH IS $N_{PN} = N_{F_i}$

603

SET PHASE $\phi_i = \min(sum(x_{min}, y_{min}))$ MODULO $N_{PN}$

605

GENERATE $P_i$ BY REPEATING $Q$ TO MATCH THE LENGTH OF $M_i$

607

$M'_i = M_i \cdot P_i$

609

700

701

GET $I, M_i$

703

FOR EACH NON-ZERO

ENTRY $m_{ij}$

IN $M_i$

SET $i'_{ij} = int(255 * m_{ij})$

TO GENERATE MASKED

IMAGE $I'$

800

801 DETECT OBJECTS/PERSONS AS BOUNDING BOXES $B_i$

803 SORT BOUNDING BOXES $B_i$

805 DIVIDE THE SORTED BOUNDING BOXES $B_i$ INTO SUB-GROUPS

807 GENERATE A TEXT CODE FOR EACH SUB-GROUP TO REPRESENT THE BOUNDING BOXES $B_i$ OF THE SUB-GROUPS

809 DETERMINE AND APPEND DIGIT TO TEXT CODE

811 GENERATE QR CODE FOR EACH TEXT CODE

1100

RECEIVE IMAGES WITH PRIVACY MASKED OBJECTS — 1101

EXTRACT MASK — 1103

DECODE FEATURE VECTOR FROM MASK — 1105

PROVIDE FEATURE MASK AS OUTPUT (E.G., FOR TRACKING OR OTHER ANALYSIS) — 1107

1301 — RECEIVE IMAGE IN CURRENT FRAME

1303 — CROP AND DECODE QR CODE

1305 — DECODE SUCCESSFUL?

NO — STOP

YES

1307 — GET COMMA-SEPARATED VALUES AND THE FIRST SUB-GROUP OF $M_i$ VALUES FOR BOUNDING BOXES $B_j$

1309 — ANOTHER QR CODE?

YES

NO — STOP

1500

GET $\{\widehat{M}'_i\}$

1501

GENERATE PN SEQUENCE $Q_i$ WHOSE LENGTH IS $N_{PN} = N_{F_i}$

1503

FOR OBJECT WITH MASK $\widehat{M}'_i$, PHASE $\phi_i = \min(sum(x_{min}, y_{min}))$ MODULO $N_{PN}$

1505

GENERATE $P_i$ BY REPEATING $Q_i$ TO MATCH THE LENGTH OF $\widehat{M}'_i$

1507

$\widehat{M}_i = P_i \cdot \widehat{M}'_i$

1509

1900

1

APPARATUS, METHOD, AND SYSTEM FOR A PRIVACY MASK FOR VIDEO STREAMS

BACKGROUND

Today cameras are everywhere: surveillance systems, camera drones, factory automation cameras, smart phones, and so on. Cameras have been part of the lives of many end users to acquire visual information about the world. For example, visual object tracking plays an important role such as in surveillance systems, traffic flow monitoring, autonomous driving, mobile robotics, and industry automation. However, the proliferation of cameras can also create privacy concerns for people and/or objects being monitored. Accordingly, there are significant technical challenges associated with preserving privacy while also maintaining the ability to track and/or perform other analytics using computer vison.

SOME EXAMPLE EMBODIMENTS

Therefore, there is a need for providing privacy masks for video or camera streams that also supports object/people tracking and other analytics.

According to one example embodiment, an apparatus comprises means for processing one or more images of a video stream to detect at least one object. The means is further configured to perform determining one or more feature vectors from a plurality of pixels of the one or more images that correspond to the at least one detected object. The means is further configured to perform encoding the one or more feature vectors into at least one mask that obscures the at least one object in the one or more images. The at least one mask is trackable across the one or more images of the video stream based on the one or more feature vectors. The means is further configured to perform causing, at least in part, an addition of the at least one mask to the one or more images of the video stream. The means is further configured to perform providing the video stream with the at least one mask as an output.

According to another embodiment, a method comprises processing one or more images of a video stream to detect at least one object. The method also comprises determining one or more feature vectors from a plurality of pixels of the one or more images that correspond to the at least one detected object. The method further comprises encoding the one or more feature vectors into at least one mask that obscures the at least one object in the one or more images. The at least one mask is trackable across the one or more images of the video stream based on the one or more feature vectors. The method further comprises causing, at least in part, an addition of the at least one mask to the one or more images of the video stream. The method further comprises providing the video stream with the at least one mask as an output.

According to another embodiment, a computer program comprising instructions which, when executed by an apparatus, cause the apparatus to perform processing one or more images of a video stream to detect at least one object. The apparatus is also caused to perform determining one or more feature vectors from a plurality of pixels of the one or more images that correspond to the at least one detected object. The apparatus is further caused to perform encoding the one or more feature vectors into at least one mask that obscures the at least one object in the one or more images. The at least one mask is trackable across the one or more images of the video stream based on the one or more feature vectors. The apparatus is further caused to perform causing, at least in part, an addition of the at least one mask to the one or more images of the video stream. The apparatus is further caused to perform providing the video stream with the at least one mask as an output.

According to another embodiment, a non-transitory computer-readable storage medium comprising program instructions that, when executed by an apparatus, cause the apparatus to perform processing one or more images of a video stream to detect at least one object. The apparatus is also caused to perform determining one or more feature vectors from a plurality of pixels of the one or more images that correspond to the at least one detected object. The apparatus is further caused to perform encoding the one or more feature vectors into at least one mask that obscures the at least one object in the one or more images. The at least one mask is trackable across the one or more images of the video stream based on the one or more feature vectors. The apparatus is further caused to perform causing, at least in part, an addition of the at least one mask to the one or more images of the video stream. The apparatus is further caused to perform providing the video stream with the at least one mask as an output.

According to another embodiment, an apparatus comprises at least one processor, and at least one memory storing instructions that, when executed by the at least one processor, cause the apparatus at least to process one or more images of a video stream to detect at least one object. The apparatus is also caused to determine one or more feature vectors from a plurality of pixels of the one or more images that correspond to the at least one detected object. The apparatus is further caused to encode the one or more feature vectors into at least one mask that obscures the at least one object in the one or more images. The at least one mask is trackable across the one or more images of the video stream based on the one or more feature vectors. The apparatus is further caused to add the at least one mask to the one or more images of the video stream. The apparatus is further caused to provide the video stream with the at least one mask as an output.

According to one example embodiment, an apparatus comprises image processing circuitry configured to perform processing one or more images of a video stream to detect at least one object and determining one or more feature vectors from a plurality of pixels of the one or more images that correspond to the at least one detected object. The apparatus also comprises encoding circuitry configured to perform encoding the one or more feature vectors into at least one mask that obscures the at least one object in the one or more images. The at least one mask is trackable across the one or more images of the video stream based on the one or more feature vectors. The apparatus further comprises output circuitry configured to perform causing, at least in part, an addition of the at least one mask to the one or more images of the video stream and providing the video stream with the at least one mask as an output.

According to one example embodiment, a system comprises one or more devices including one or more of a cloud server device, an edge device, an internet of things (IoT) device, a user equipment device, or a combination thereof. The one or more devices are configured to process one or more images of a video stream to detect at least one object. The one or more devices are also configured to determine one or more feature vectors from a plurality of pixels of the one or more images that correspond to the at least one detected object. The one or more devices are further configured to encode the one or more feature vectors into at least one mask that obscures the at least one object in the one or more images. The at least one mask is trackable across the one or more images of the video stream based on the one or more feature vectors. The one or more devices are further configured to add the at least one mask to the one or more images of the video stream. The one or more devices are further configured to provide the video stream with the at least one mask as an output.

According to a further embodiment, a device comprises at least one processor; and at least one memory including a computer program code for one or more programs, the at least one memory and the computer program code configured to, with the at least one processor, cause the device to process one or more images of a video stream to detect at least one object. The device is also caused to determine one or more feature vectors from a plurality of pixels of the one or more images that correspond to the at least one detected object. The device is further caused to encode the one or more feature vectors into at least one mask that obscures the at least one object in the one or more images. The at least one mask is trackable across the one or more images of the video stream based on the one or more feature vectors. The device is further caused to add the at least one mask to the one or more images of the video stream. The device is further caused to provide the video stream with the at least one mask as an output.

According to one example embodiment, an apparatus comprises means for receiving one or more images of a video stream. The one or more images include at least one mask. The means are also configured to perform extracting the at least one mask from the one or more images. The at least one mask encodes one or more feature vectors that represent at least one object obscured by the at least one mask. The at least one mask is also trackable across the one or more images of the video stream based on the one or more feature vectors. The means are further configured to perform decoding the one or more feature vectors from the at least one mask. The means are further configured to perform providing the one or more feature vectors as an output.

According to another embodiment, a method comprises receiving one or more images of a video stream. The one or more images include at least one mask. The method also comprises extracting the at least one mask from the one or more images. The at least one mask encodes one or more feature vectors that represent at least one object obscured by the at least one mask. The at least one mask is also trackable across the one or more images of the video stream based on the one or more feature vectors. The method further comprises decoding the one or more feature vectors from the at least one mask. The method further comprises providing the one or more feature vectors as an output.

According to another embodiment, a computer program comprising instructions which, which executed by an apparatus, cause the apparatus to perform receiving one or more images of a video stream. The one or more images include at least one mask. The apparatus is also caused to perform extracting the at least one mask from the one or more images. The at least one mask encodes one or more feature vectors that represent at least one object obscured by the at least one mask. The at least one mask is also trackable across the one or more images of the video stream based on the one or more feature vectors. The apparatus is further caused to perform decoding the one or more feature vectors from the at least one mask. The apparatus is further caused to perform providing the one or more feature vectors as an output.

According to another embodiment, a non-transitory computer-readable storage medium comprising program instructions that, when executed by an apparatus, cause the apparatus to perform receiving one or more images of a video stream. The one or more images include at least one mask. The apparatus is also caused to perform extracting the at least one mask from the one or more images. The at least one mask encodes one or more feature vectors that represent at least one object obscured by the at least one mask. The at least one mask is also trackable across the one or more images of the video stream based on the one or more feature vectors. The apparatus is further caused to perform decoding the one or more feature vectors from the at least one mask. The apparatus is further caused to perform providing the one or more feature vectors as an output.

According to another embodiment, an apparatus comprises at least one processor, and at least one memory storing instructions that, when executed by the at least one processor, cause the apparatus at least to receive one or more images of a video stream. The one or more images include at least one mask. The apparatus is also caused to extract the at least one mask from the one or more images. The at least one mask encodes one or more feature vectors that represent at least one object obscured by the at least one mask. The at least one mask is also trackable across the one or more images of the video stream based on the one or more feature vectors. The apparatus is further caused to decode the one or more feature vectors from the at least one mask. The apparatus is further caused to provide the one or more feature vectors as an output.

According to one example embodiment, an apparatus comprises image processing circuitry configured to perform receiving one or more images of a video stream, wherein the one or more images include at least one mask, and extracting the at least one mask from the one or more images. The at least one mask encodes one or more feature vectors that represent at least one object obscured by the at least one mask. The at least one mask is also trackable across the one or more images of the video stream based on the one or more feature vectors. The apparatus also comprises decoding circuitry configured to perform decoding the one or more feature vectors from the at least one mask. The apparatus further comprises output circuitry configured to perform providing the one or more feature vectors as an output.

According to one example embodiment, a system comprises one or more devices including one or more of a cloud server device, an edge device, an internet of things (IoT) device, a user equipment device, or a combination thereof. The one or more devices are configured to receive one or more images of a video stream. The one or more images include at least one mask. The one or more devices are also configured to extract the at least one mask from the one or more images. The at least one mask encodes one or more feature vectors that represent at least one object obscured by the at least one mask. The at least one mask is also trackable across the one or more images of the video stream based on the one or more feature vectors. The one or more devices are further configured to decode the one or more feature vectors from the at least one mask. The one or more devices are further configured to provide the one or more feature vectors as an output.

According to a further embodiment, a device comprising at least one processor; and at least one memory including a computer program code for one or more programs, the at least one memory and the computer program code configured to, with the at least one processor, cause the device to receive one or more images of a video stream. The one or more images include at least one mask. The device is also caused to extract the at least one mask from the one or more images. The at least one mask encodes one or more feature vectors that represent at least one object obscured by the at least one mask. The at least one mask is also trackable across the one or more images of the video stream based on the one or more feature vectors. The device is further caused to decode the one or more feature vectors from the at least one mask. The device is further caused to provide the one or more feature vectors as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

According to some aspects, there is provided the subject matter of the independent claims. Some further aspects are defined in the dependent claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The example embodiments of the invention are illustrated by way of examples, and not by way of limitation, in the figures of the accompanying drawings:

FIG. 12 is a diagram of a decoding pipeline for decoding a feature vector from a privacy mask in video streams, according to one example embodiment;

DESCRIPTION OF SOME EMBODIMENTS

Examples of a method, apparatus, and computer program for providing a privacy mask for video streams, according to one embodiment, are disclosed in the following. In the following description, for the purposes of explanation, numerous specific details and examples are set forth to provide a thorough understanding of the embodiments of the invention. It is apparent, however, to one skilled in the art that the embodiments of the invention may be practiced without these specific details or with an equivalent arrangement. In other instances, structures and devices are shown in block diagram form to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" cancan also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

As used herein, "at least one of the following: <a list of two or more elements>," "at least one of <a list of two or more elements>," "<a list of two or more elements> or a combination thereof," and similar wording, where the list of two or more elements are joined by "and" or "or", mean at least any one of the elements, or at least any two or more of the elements, or at least all the elements.

Figure 1:
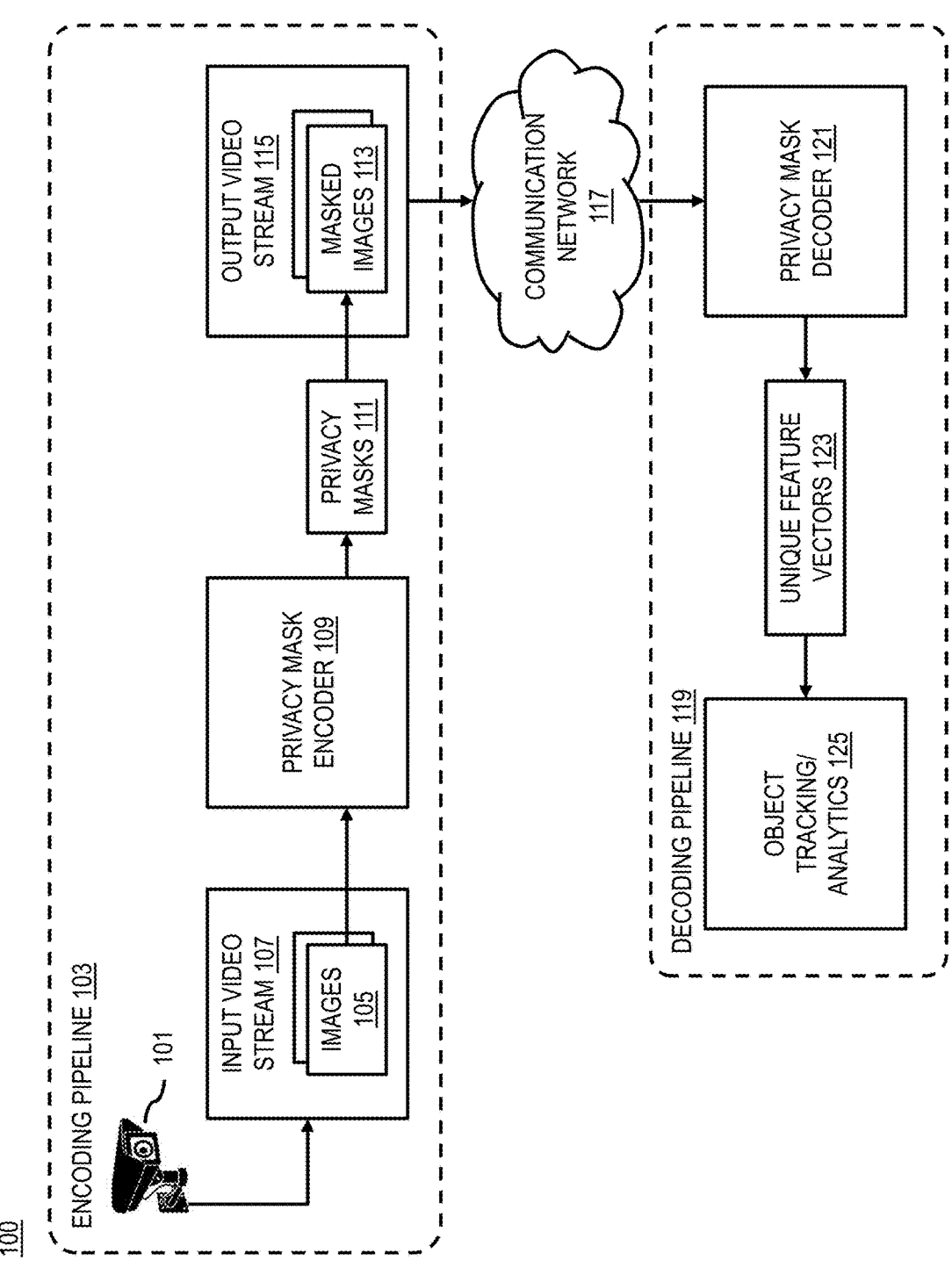
FIG. 1 is a diagram of a system capable of providing a privacy mask for video streams, according to one example embodiment.

FIG. 1 is a diagram of a system 100 capable of providing a privacy mask for video streams, according to one example embodiment. One or more cameras 101 (e.g., surveillance systems as well as other types of cameras such as but not limited to camera drones, factory automation cameras, smart phones, and/or the like) are being increasingly used for a variety of applications such as, but not limited to, surveillance, traffic low monitoring, autonomous driving, mobile robotics, industry automation, and/or the like. However, because cameras 101 may be everywhere, there are potential privacy concerns with capturing identifiable people and/or other objects in resulting images or video/camera streams.

To protect the privacy of people and/or objects (hereinafter referred to collectively as objects), masking can be used to hide or otherwise obscure the identifiable features of one or more objects in video streams. For example, traditional masking comprises detecting an object in an image/frame and then overlaying a solid mask to hide the detected object. However, while the use of traditional masking out of individuals or objects at the camera source addresses privacy concerns, there is a serious drawback of doing this: there is complete loss of information about the individual or object (e.g., a monitored asset) that prohibits any analysis of an image or video clip from a camera 101 for the purposes of certain applications such as surveillance or factory automation.

For example, in the context of surveillance, a basic question such as "where in the store or factory did the individual that was seen in location X go" can no longer be answered as all visual information about the person is lost. In this example context, the exact identity of the detected person may not be needed, but the surveillance system would need enough information to determine that an object mask in one image or frame of the video stream is the same as another mask in another image or frame to support tracking across image frames of the video stream or clip. In another context, factory automation may depend on tracking an object (e.g., a part or product) as it moves through the factory to monitor the operation of factory processes without having to identify the exact type of object (e.g., to protect sensitive or classified products from potential exposure). With conventional or traditional masking, such factory automation monitoring would not be possible because visual information about the object would be lost.

Figure 2:
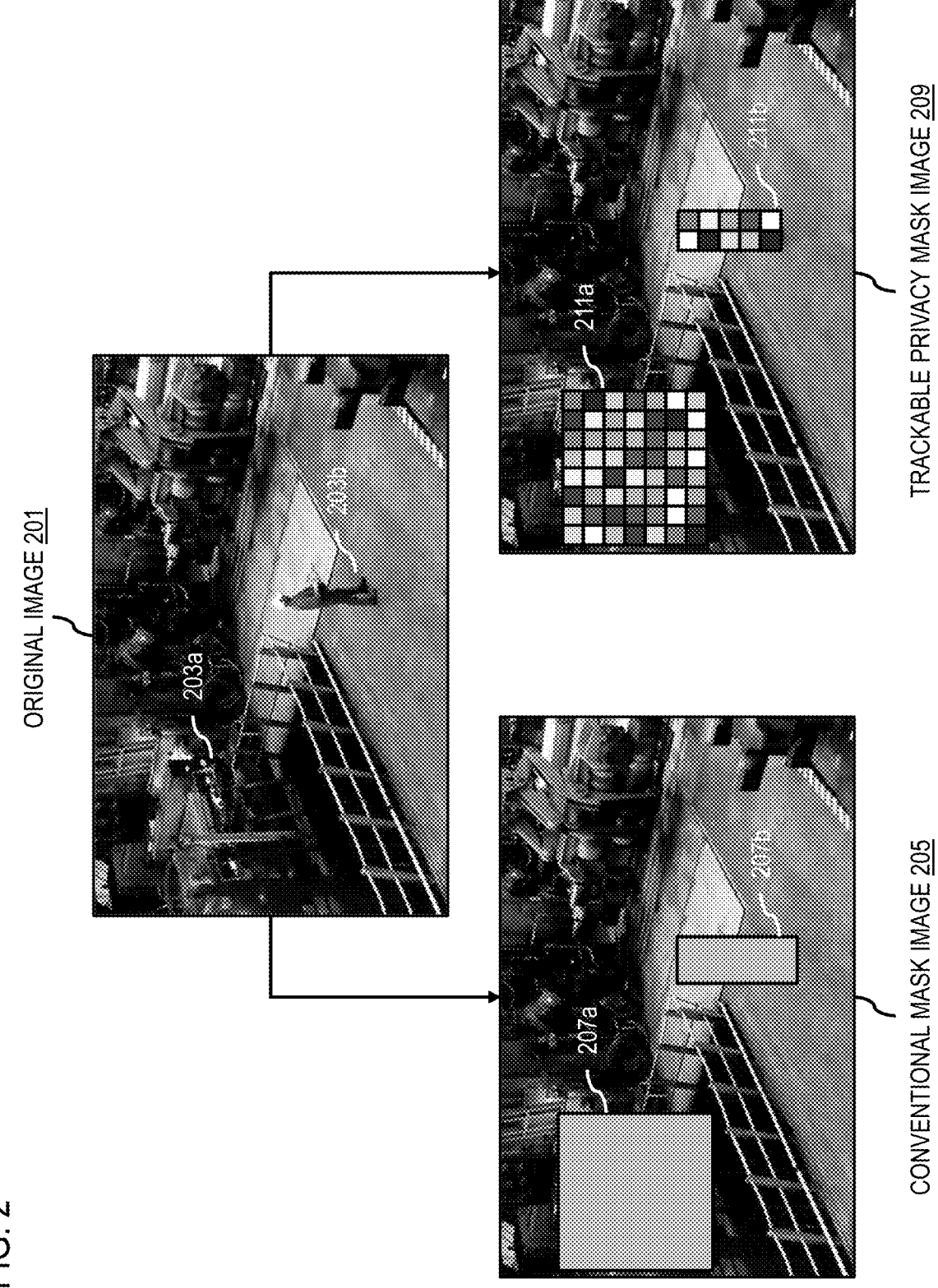
FIG. 2 is a diagram illustrating a comparison of conventional masks to trackable privacy masks, according to one example embodiment.

FIG. 2 is a diagram illustrating a comparison of conventional masks to trackable privacy masks, according to one example embodiment. In the example of FIG. 2, an original image 201 is a frame of a surveillance camera video stream. The original image 201 depicts sensitive machinery 203a (e.g., machinery with components that are to be protected from potential exposure) as well as an individual 203b whose identity is privacy sensitive. Under a conventional approach, a conventional mask image 205 can be generated which uses a conventional mask 207a to cover the portion of the image 205 corresponding to the sensitive machinery 203a and a conventional mask 207b to cover the portion of the image 205 corresponding to the individual 203b. The conventional masks 207a and 207b are solid masks that completely obscure the visual features of the underlying sensitive machinery 203a and individual 203b, thereby resulting in information loss about the visual features. Because the conventional masks 207a and 207b completely hide the unique visual features of the sensitive machinery 203a and individual 203b, applications that rely on tracking objects between images or frames (e.g., surveillance, factory automation, etc.) based on these unique features are technically difficult to support under a conventional mask approach.

In other words, the conventional approach is to mask out pixels which results in information loss. For example, Company A can still log inventory that is not masked in a monitored video stream and has no privacy issues with the objects being inventoried. However, Company B can no longer automatically track personnel movement using surveillance cameras in a factory due to loss of unique visual features resulting from conventional masking because of privacy concerns. Therefore, there are significant technical challenges with respect to providing a trackable mask for objects detected in video or camera streams.

To address these technical challenges, the system 100 of FIG. 1 introduces a capability to generate a trackable mask for objects (e.g., persons and sensitive assets) which will preserve visual privacy but at the same time encode within the mask, features that are unique to the person or asset to enable tracking across images or frames of a video stream. In other words, instead of masking out the pixels of the detected person or object in an image, the system 100 generates and transmits a feature vector for each object represented by a masked region of the image where the feature vector is trackable by downstream processes.

In one example embodiment, the system 100 does this by using an encoding pipeline 103 to transform the visual features (e.g., associated with objects detected in one or more images/frames 105 of an input video stream 107) from a pixel domain to a lower dimensional domain (e.g., via a privacy mask encoder 109) to generate trackable privacy masks 111 that present the lower dimensional domain (or transformed visual feature information) in place of the pixel domain information (e.g., exact pixel representations of the objects in the images/frames 105 of input video stream 107). As used herein, the term "lower dimensional domain" refers to object visual feature information that is derived and representative of the pixel domain information that has been transformed so that the lower dimensional information still uniquely represents an object without enabling specific identification of the object (e.g., the identity of the specific individual or object).

In other words, the visual feature information of the object is transformed from corresponding image pixels such that the transformed information (e.g., encoded in trackable privacy masks 111) can be still used by devices and/or algorithms for applications that depend on being able to relate a detected object in one image to the same object in another image. In one example embodiment, the trackable privacy masks 111 are added or overlaid on the corresponding portion of the original images/frames 105 to generate masked images/frames 113 of an output video stream 115. The output video stream 115 with the masked images 113 is provided as an output in place of the input video stream 107, e.g., when the output video stream 115 is transmitted beyond an associated premise, source, and/or device.

Returning to the example of FIG. 2, in one example embodiment, the system 100 can process the original image 201 to preserve the visual privacy of the sensitive machinery 203a and individual 203b as shown in trackable privacy mask image 209. In this example, the trackable privacy mask 211a overlaid on sensitive machinery 203a and trackable privacy mask 211b overlaid on individual 203b have information embedded in the respective masks 211a and 211b (e.g., encoded in the shading/color of the blocks or cells forming the respective masks 211a and 211b) that enables, for example, tracking persons and/or objects without exposing privacy sensitive information about the associated objects. For example, tracking persons enables a company to provide occupancy statistics without having to determine the specific identities of the persons present in company facilities.

At a high level, the various example embodiments described herein generate trackable privacy masks 111 for objects detected in images and/or video/camera streams that preserve unique features so that although not distinguishable for the human eye, the masks can be used to generate unique feature vectors that are useful for tracking and automation algorithms including both traditional and machine learning based algorithms.

In one example embodiment, the output video stream 115 with the masked images 113 generated by the encoding pipeline 103 (e.g., a device, apparatus, system, etc. comprising means configured to perform the encoding pipeline 103) can be transmitted over a communications network 117 to a decoding pipeline 119 (e.g., associated with a device, apparatus, system, etc. comprising means configured to perform the decoding pipeline 119). For example, a privacy mask decoder 121 of the decoding pipeline 119 receives the output video stream 115 with the masked images 113. The privacy mask decoder extracts the trackable privacy masks 111 from the masked images 113 to determine the unique feature vectors 123 associated with the objects corresponding to the trackable privacy masks 111. The unique feature vectors 123 can then be provided as output for used by various object tracking and/or other analytics applications 125.

The approach of the various embodiments described herein provide for several technical features and advantages. For example, in one example embodiment, the system 100 adds or inserts the trackable privacy masks 111 directly into the pixels of the images (e.g., by overlaying the masks on the pixels corresponding to the detected object). In this way, the trackable privacy masks 111 become a part of the video stream such that no additional transmission channel/mechanism and associated transmission/computing resources are needed to convey the privacy masks generated according to the various embodiments described herein. In some example embodiments, mask information (e.g., bounding box information corresponding to the detected objects) that maps the trackable privacy masks 111 to corresponding pixels or locations in the masked images can also be transmitted to facilitate extraction of the masks (e.g., by (1) embedding the mask information in a code in the image—e.g., a visual representation, such as a quick reaction (QR) code, a bar code, or any other equivalent encoding scheme as a part of the video stream; or (2) transmitting via standard channels—e.g., Open Network Video Interface Forum (ONVIF) standard).

In summary, the various embodiments provide for features and advantages such as, but not limited to, any combination of:

(1) Provides a protected pathway for the coded privacy mask information and/or associated bounding box information over the same pixels as the original video stream;

(2) Protects privacy for feature vector transmission over the same pixels as the original video stream;

(3) Provides mask generation that preserves unique features so that although not distinguishable for human eye, the masks can be used to generate unique feature vectors (e.g. for tracking or other analytics);

(4) Provides color spectrum based feature vector coding combined with error correction;

(5) Provides QR code (or equivalent) for transmitting bounding box information (mask information) in the same video stream;

(6) Assigns secret/random object identification code (and/or avatar) for object monitoring while maintaining privacy;

(7) In one example embodiment, includes all information (e.g., trackable privacy mask information, bounding box information, etc.) via one channel (e.g., the output video stream 115) but, in other example embodiments, also possible to use two channels (e.g., masked image (I') in one channel, and bounding box information (Be) in another channel via ONVIF standard or equivalent) because the "main channel cannot be encoded"; and (8) Sends all privacy mask information via pixels with no extra pixel data or metadata sent, and thus no extra bandwidth is needed.

It is contemplated that the functions of the components of the system 100 or any of its components described above may be combined or performed by other components or means of equivalent functionality. The above presented components or means can be implemented in a circuitry, a hardware, a firmware, a software, a chip set, or a combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In another embodiment, one or more of the components of the system 100 may be implemented as a cloud-based service, local service, native application, or combination thereof. The functions of the system 100 and its components are discussed with respect to figures below.

Figure 3:
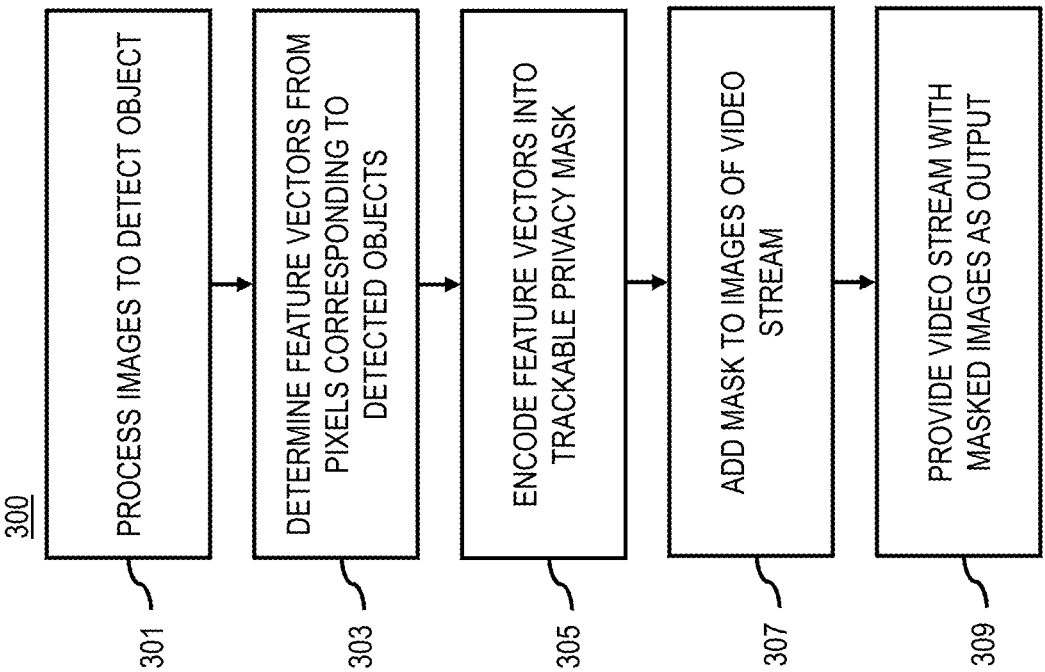
FIG. 3 is a flowchart of a process for encoding unique visual features in a privacy mask, according to one example embodiment.
Figure 18:
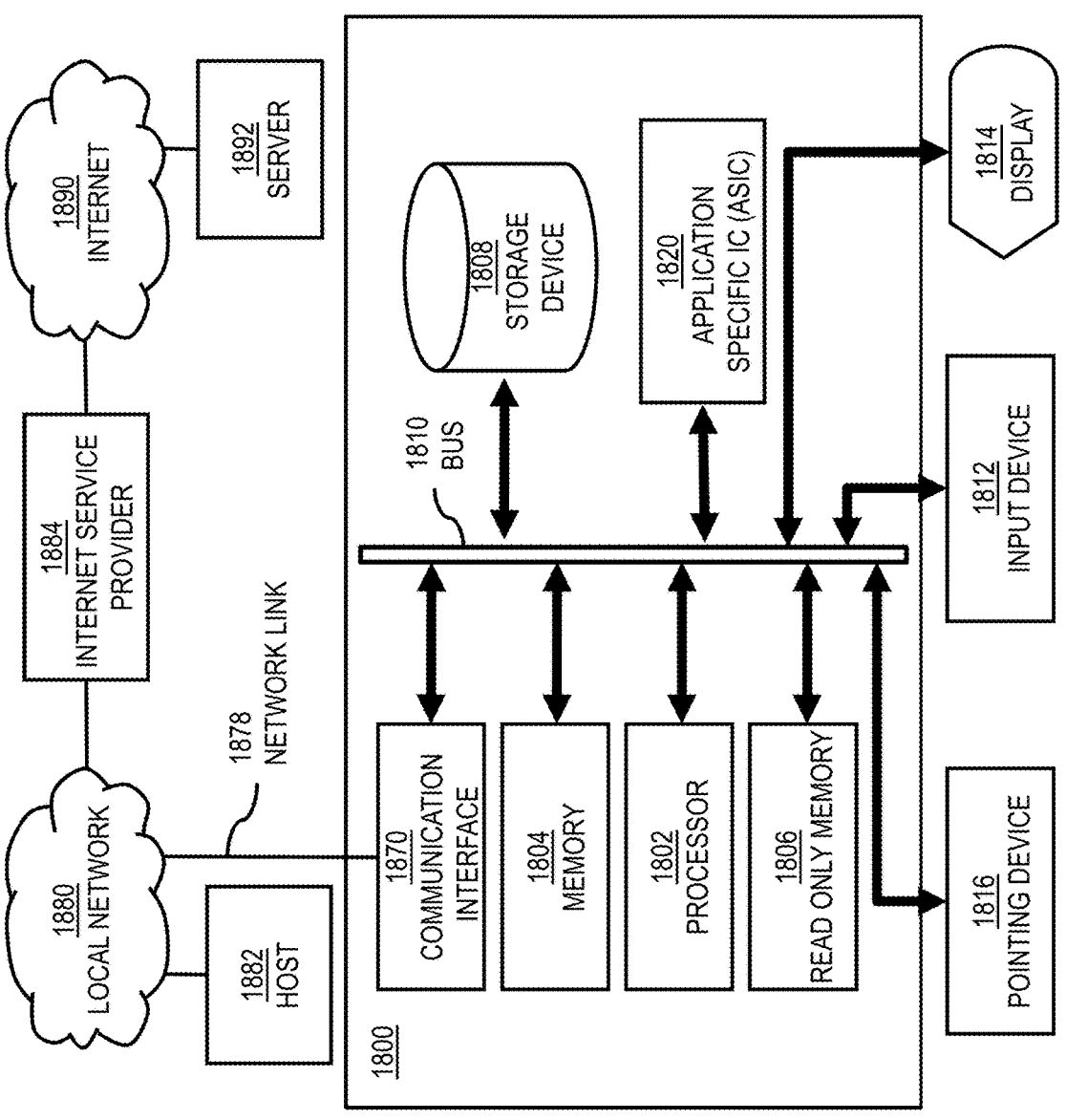
FIG. 18 is a diagram of hardware that can be used to implement an embodiment.
Figure 19:
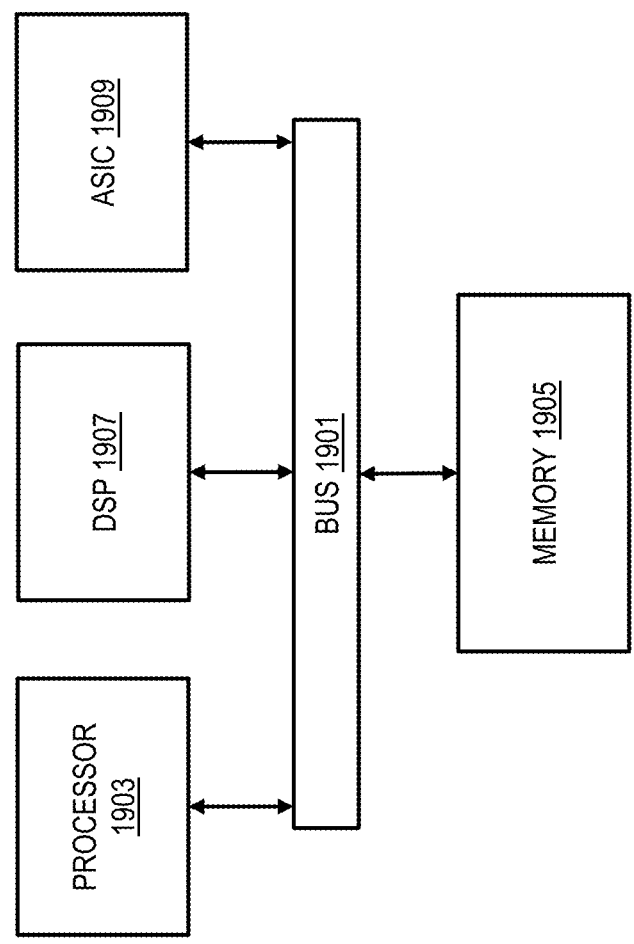
FIG. 19 is a diagram of a chip set that can be used to implement an embodiment.

FIG. 3 is a flowchart of a process 300 for encoding unique visual features in a privacy mask 111, according to one example embodiment. In various example embodiments, the encoding pipeline 103 and/or any its components (e.g., privacy mask encoder 109) may perform one or more portions of a process 300 and may be implemented in/by various means, for instance, a chip set including a processor and a memory as shown in FIG. 18 or 19 or in a circuitry, hardware, firmware, software, or in any combination thereof. In one example embodiment, the circuitry includes but is not limited to image processing circuitry, encoding circuitry, and output circuitry. As such, the system 100, the encoding pipeline 103, any of the components of the encoding pipeline 103, and/or any associated apparatus, device, circuitry, system, computer program product, and/or non-transitory computer readable medium can provide means for accomplishing various parts of the process 300, as well as means for accomplishing embodiments of other processes described herein. Although the process 300 is illustrated and described as a sequence of steps, it is contemplated that various embodiments of the process 300 may be performed in any order or combination and need not include all of the illustrated steps. The process 300 is described with respect to FIG. 4 which is a diagram of an encoding pipeline for generating a privacy mask for video streams, according to example embodiment, as well as with respects to FIGS. 5-10C.

In step 301, the encoding pipeline 103 (or the privacy mask encoder 109 or image processing circuitry) processes one or more images of a video stream to detect at least one object. The one or more images and/or the video stream can be received from any video source. Examples of a video source include, but are not limited to, camera 101 or other sensor capturing video and/or a rendering engine for providing synthetic video streams (e.g., artificially and/or software generated videos or image sequences such as game, augmented reality (AR) and/or virtual reality (VR) streams and/or environments). The video sources can originate from devices, such as drones, surveillance cameras, Internet of Things (IoT) devices, game units/servers, augmented reality (AR) unit/server and/or virtual reality (VR) unit/server etc. or any combination thereof—to provide raw video streams or image sequences of target objects to track or analyze.

Figure 4:
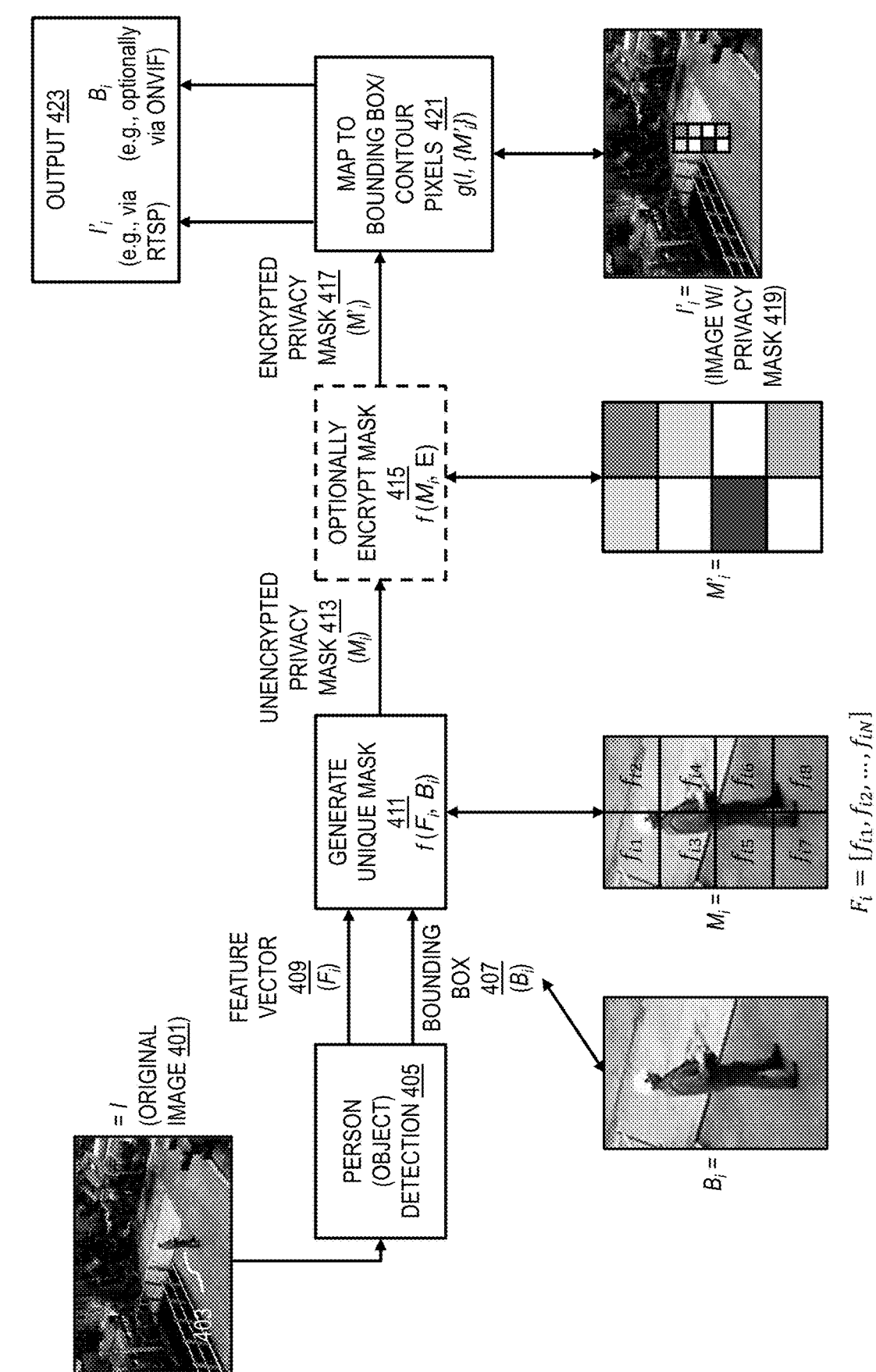
FIG. 4 is a diagram of an encoding pipeline for generating a privacy mask for video streams, according to one example embodiment.

As shown in the example of FIG. 4, a camera (e.g., camera 101) senses the environment and produces image I (e.g., referred to as original image 401), e.g. as a part of video stream. The original image 401 I, for instance, depicts an object or individual 403 who is to be masked for privacy but who is still to be tracked by the system 100. The original image 401 I is processed using person (object) detection and/or feature extraction 405 that uses one or more machine learning (ML) means, such as one or more neural networks, e.g., a deep neural network (DNN), a convolutional neural network (CNN), You Only Look Once (YoLo) network, and/or equivalent image recognition algorithm, that can be trained, for example, with Aff-Wild2 and/or ImageNet datasets, to detect and recognize objects, such as persons, in the original image 401 I. It is noted that ML-based object detection is provided by way of illustration and not as a limitation. It is contemplated that non-ML-based object detectors can also be used according to the various embodiments described herein. For example, a bounding box or object detection can be generated using a region of interest (ROI) based tracker. In one example embodiment, the person (object) detection 405 generates a detection of the individual 403 by delineating the pixels of the original image 401 I that correspond to the detected individual 403 with a bounding box $B_i$ 407. It is noted that a bounding box is provided by way of illustration and not as a limitation, and it is contemplated that the ML can use any means to delineate the image area associated with the detected individual 403 or object (e.g., a pixel contour, image segmentation, mask, etc.) along with associated confidence of detection.

In one example embodiment, the image 401 I (of width W×height H) from a camera source (e.g., camera 101) arrives at the input of a pretrained object detector (e.g., YoLo) which detects persons and objects of interest that need to be masked. The object detector, for instance, is deep neural network (DNN) based and can extract feature vectors from pixel values sensed by the camera for the persons and objects. The visual feature seen by the camera for a given person or object in a frame is mapped to a corresponding unique feature vector $F_i$ (dimension is $1 \times N_F$, where $N_F$ is the number of features). The set of pixels used for the feature extractions are defined by a bounding box $B_i$ (e.g., with a dimension of 4) generated by an object detector.

In step 303, the encoding pipeline 103 (or the privacy mask encoder 109 or image processing circuitry) determines one or more feature vectors $F_i$ 409, where feature vector $F_i$ 409 represents the feature vector for detection i determined from a plurality of pixels of the one or more images that correspond to the at least one detected object. The pixels corresponding to the detected object (e.g., individual 403), for instance, are determined based on the bounding box determined by the ML means (e.g., the pixels within the bounding box $B_i$ 407). In one embodiment, the feature vector $F_i$ 409 comprises multiple elements that represent different visual features about the detected object. For example, to represent the color of the detected object (or one or more pixels of the detected object), the feature vector $F_i$ 409 can contain elements corresponding to red (R), green (G), and blue (B) values of the object or pixels of the object (e.g., $F_i = [R, G, B]$). It is noted that color features are provided as examples and not as limitations. It is contemplated that any type of visual feature or feature extraction technique can be used according to the various embodiments described herein such as but not limited to histogram of oriented gradients (HOG), speeded-up robust features (SURF), local binary patterns (LBP), Haar wavelets, color histograms, and/or the like. In various embodiments, in addition or alternatively, feature extraction can be performed based on deep neural networks (e.g., convolutional neural network (CNN) based).

In one example embodiment of the process 411, to generate a unique mask from a feature vector $F_i$ 409 for a given object i (e.g., individual 403), the encoding pipeline 103 (or the privacy mask encoder 109 or encoding circuitry) subdivides an image area bounding the plurality of pixels into a plurality of cells (e.g., delineated by the bounding box $B_i$ 407 or equivalent). This subdivision results in a transformation of the pixels of the image to a lower dimensional domain (e.g., by grouping individual pixels into cells or equivalents sets that are then treated as a single entity for purposes of generating a trackable privacy mask). In the example of FIG. 4, the pixels of the bounding box $B_i$ 407 are subdivided into eight grid cells comprising equal numbers of pixels or portions of the original image I 401 within each cell. The encoding pipeline 103 (or the privacy mask encoder 109 or encoding circuitry) then replaces at least one cell of the plurality cells, at least one pixel of the plurality of pixels, or a combination thereof by a function of at least one element of the one or more feature vectors (e.g., feature vector $F_i$ 409). For example, to obtain a complete mask each of the cells or pixels comprising the cells can be replaced by a visual representation determined using a function of a feature vector element (e.g., indicated as $f_{iN}$ where $f$ represents the respective function, i represents the number of the detected object, and N represents the feature vector element). In one embodiment, the function is used to transform the real-value of the feature vector element to a color, shade, or other visual representation to replace the portion of the original image in the corresponding cell or pixels of the cell of the subdivided portion of the image area.

In summary, the feature vector $F_i$ 409 is a real-valued vector (e.g., embedding) that represent the detected object's visual features. The elements of the feature vector $F_i$ 409 represent various respective visual features of the appearance of the detected object within the bounding box $B_i$ 407. It is contemplated the feature vector $F_i$ 409 can be based on any visual feature extractable from the pixels. In one example embodiment, the one or more feature vectors $F_i$ 409 are encoded based, at least in part, on color spectrum based feature vector coding. In other words, in one example embodiment, the real-values of the feature vector $F_i$ 409 are based on the color values of the pixels within the bounding box $B_i$ 407. The bounding box $B_i$ 407 can then be subdivided into grid cells of multiple pixels (e.g., to transform the individual pixels of the bounding box $B_i$ 407 to a lower domain). These cells are then replaced by colors, shading, or other visual representations generated from a function (e.g., $f_{iN}$) that transforms the real-value of a feature vector element to the replacement color, shading, or visual feature value for rendering the privacy mask.

In step 305, the encoding pipeline 103 (or the privacy mask encoder 109 or encoding circuitry) encodes the one or more feature vectors (e.g., $F_i=[f_{i1}, f_{i2}, \ldots, f_{iN}]$ via the process 411 into at least one unencrypted mask (e.g., unencrypted privacy mask $M_i$ 413) that obscures the at least one object in the one or more images. The obscuring of the object (e.g., individual 403) in the original image I 401 is based on the representing the real values of the respective cell feature (e.g., via functions $f_{iN}$) as shading, color, or any other visual characteristic applied to each grid cell to generate the trackable privacy mask $M_i$ 413. By way of example, the at least one mask is trackable across the one or more images of the video stream based on the one or more feature vectors $F_i$ 409 encoded into the trackable privacy mask $M_i$ 413. This is because, the one or more feature vectors $F_i$ 409 are likely to be unique to each object based on its visual appearance while also avoiding specific identification of the object (e.g., by a human observer of the image or video stream) to preserve privacy.

In one embodiment, the feature vector $F_i$ 409 is based on the visual appearance of the pixels within the entire bounding box $B_i$ 407 associated with the detected object. For example, a deep neural network based object detector (e.g., YoLo) or equivalent object detector detects object 1 and object 2 and puts respective bounding boxes on object 1 and object 2 in the image. The encoding pipeline 109 then generates one feature vector $F_i$ 409 for the entire bounding box based on all the pixels within the bounding box of each object. Thus, there will be a first feature vector $F_1$ generated for object 1 and a second feature $F_2$ generated for object 2 from all of the pixels in their respective bounding boxes.

In another embodiment, the image area of the bounding box $B_i$ 407 is subdivided (e.g., into grid cells). Then, the encoding pipeline can determine a cell feature vector $F_{cell_i}$ based on the visual appearance within a specific grid cell for one or more of the grid cells. A common feature vector for the entire bounding box (e.g., the feature vector $F_i$ 409) is calculated based on determined cell feature vectors $F_{cell_i}$ (e.g., a mean value, etc.). For example, the encoding pipeline 109 can use an image transformation process (e.g., scale-invariant feature transform (SIFT) or equivalent) to generate a cell feature vector $F_{cell_i}$ for each grid cell of the bounding box $B_i$ 407 based on the pixels within that grid cell. Then, the encoding pipeline 109 concatenates or otherwise aggregates the generated cell feature vectors $F_{cell_i}$ to generate the feature vector $F_i$ 409 for the entire bounding box $B_i$ 407. It is noted that with "concatenation," the resulting feature vector $F_i$ 409 can be a long feature vector. In one embodiment, to avoid long feature vectors, the encoding pipeline 109 can use an alternative aggregation process (such as but not limited to taking a mean of the cell feature vectors $F_{cell_i}$) to generate the resulting feature vector $F_i$ 409.

Figure 5:
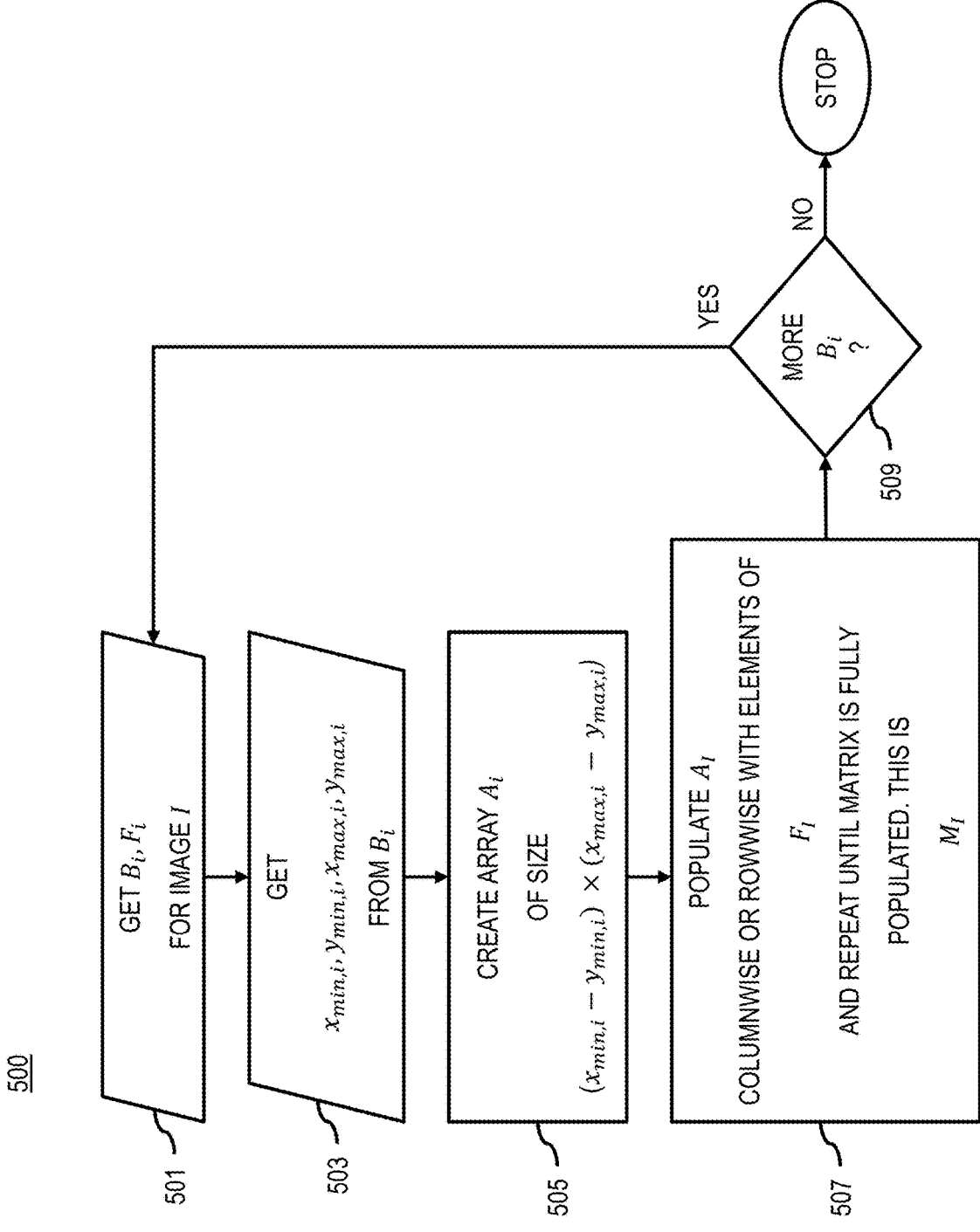
FIG. 5 is a flowchart of a process for mask generation, according to one example embodiment.

FIG. 5 is a flowchart that summarizes a process 500 for mask generation, according to one example embodiment. In various example embodiments, the encoding pipeline 103 and/or any its components (e.g., privacy mask encoder 109) may perform one or more portions of the process 500 and may be implemented in/by various means, for instance, a chip set including a processor and a memory as shown in FIG. 18 or 19, or in a circuitry, hardware, firmware, software, or in any combination thereof. In one example embodiment, the circuitry includes but is not limited to image processing circuitry, encoding circuitry, and output circuitry. As such, the system 100, the encoding pipeline 103, any of the components of the encoding pipeline 103, and/or any associated apparatus, device, circuitry, system, computer program product, and/or non-transitory computer readable medium can provide means for accomplishing various parts of the process 500, as well as means for accomplishing embodiments of other processes described herein. Although the process 500 is illustrated and described as a sequence of steps, it is contemplated that various embodiments of the process 500 may be performed in any order or combination and need not include all of the illustrated steps.

At process 501, the encoding pipeline 103 retrieves each bounding box $B_i$ and feature vector $F_i$ (e.g., generated according to various embodiments described above) associated with each object or individual that is to be masked in an image I.

At process 503, the encoding pipeline 103 gets the minimum and maximum x and y pixel coordinates (e.g., $x_{min,i}$, $y_{min,i}$, $x_{max,i}$, $y_{max,i}$) of each bounding box $B_i$ in the image I to create an array $A_i$ of size $(x_{min,i}\ y_{min,i}) \times (x_{max,i} - y_{max,i})$ which represents the mask $M_i$ for the detected object in each bounding box $B_i$ (process 505).

At process 507, the encoding pipeline 103 populates the array $A_i$ column wise or row wise with elements of the feature vector $F_i$ generated for the corresponding detected object. This is repeated for each row and column until the array $A_i$ is populated. The populated array $A_i$ is the mask $M_i$. In one embodiment, to transform the value of the feature element in each element of the mask $M_i$ and function ($f$) can be applied to transform the real-value of the element to a visual representation that can be rendered in the image as part of the mask $M_i$.

In one embodiment, the encoding pipeline 109 can consider the three channels (e.g., red, green, and blue color channels) of an image when encoding the feature vector $F_i$ to generate the mask $M_i$. The following is one but not exclusive example of multi-channel pixel encoding:

Convert the feature vector $F_i$ into binary bits (e.g., by taking into quantization resolution)

Encrypt the binary bits (e.g., by randomly scrambling the feature bits)

Optionally, apply error correction (e.g., forward error correction (FEC) such as but not limited to convolutional coding, turbo coding, low-density parity check (LDPC), or equivalent) to the scrambled feature bits For a bounding box $B_i$ of height H and width W, there are H×W pixels=>3×H×W bytes=>8×3×H×W bits Map the encoded scrambled feature bits to 8×3×H×W bits (e.g., repetition coding for diversity)

Convert 8×3×H×W bits back to H×W three-channel pixel bytes to generate the mask $M_i$.

At process 509, the encoding pipeline 103 repeats the mask generation process 500 repeats there is no more bounding box $B_i$ to process.

In one example embodiment, to provide a higher level of privacy, the encoding pipeline 103 (or the privacy mask encoder 109 or encoding circuitry) can optionally perform causing, at least in part, an encryption of the one or more encoded feature vectors $F_i$ 409 to generate the at least one mask via, e.g., optional process 415 using any encryption algorithm E known in the art to generate encrypted privacy mask M'$_i$ 417. For example, the real-values of the feature vectors $F_i$ 409 are encrypted to further protect privacy by making it less likely that an individual or object can be positively identified from the resulting encrypted privacy mask M'$_i$ 417 relative to the unencrypted privacy mask $M_i$ 413.

Figure 6:
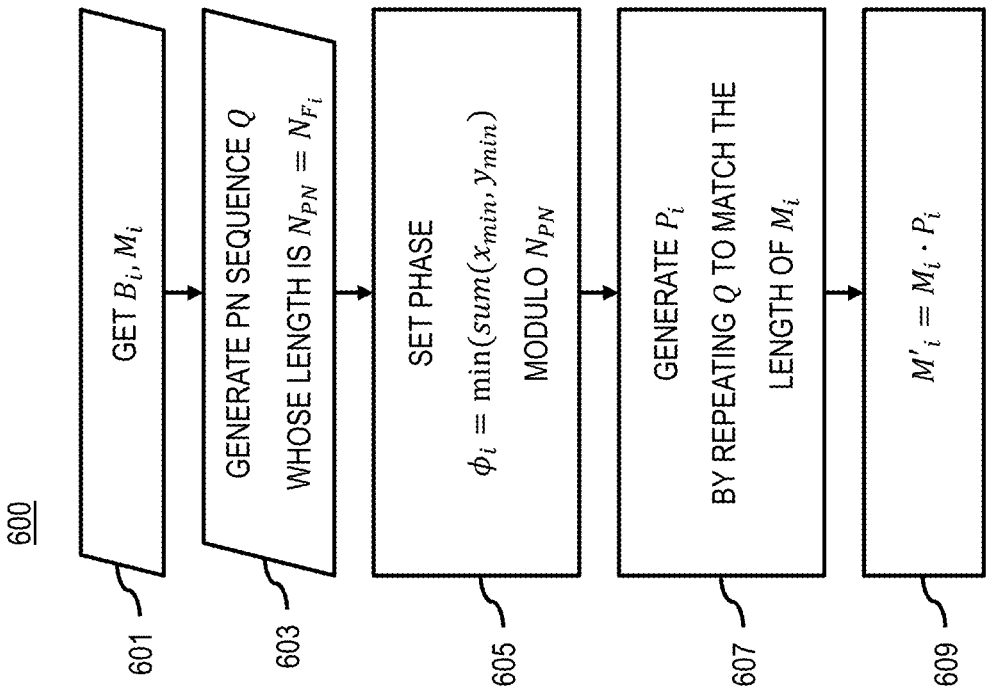
FIG. 6 is a flowchart of a process for encrypting a mask, according to one example embodiment.

FIG. 6 is a flowchart of a process 600 for encrypting a mask, according to one example embodiment. In various example embodiments, the encoding pipeline 103 and/or any its components (e.g., privacy mask encoder 109) may perform one or more portions of the process 600 and may be implemented in/by various means, for instance, a chip set including a processor and a memory as shown in FIG. 18 or 19, or in a circuitry, hardware, firmware, software, or in any combination thereof. In one example embodiment, the circuitry includes but is not limited to image processing circuitry, encoding circuitry, and output circuitry. As such, the system 100, the encoding pipeline 103, any of the components of the encoding pipeline 103, and/or any associated apparatus, device, circuitry, system, computer program product, and/or non-transitory computer readable medium can provide means for accomplishing various parts of the process 600, as well as means for accomplishing embodiments of other processes described herein. Although the process 600 is illustrated and described as a sequence of steps, it is contemplated that various embodiments of the process 600 may be performed in any order or combination and need not include all of the illustrated steps.

As described above, in one embodiment, to protect against the possibility of regenerating the inverse mapping from mask $M_i$ to feature vector $F_i$ to image I, an encryption is applied on top of $M_i$.

At process 601, the encoding pipeline 103 generates an unencrypted $M_i$ for a bounding box $B_i$. In one example embodiment, at process 603, the encoding pipeline 103 can use a pseudonoise (PN) code sequence generator to generate a PN sequence Q whose sequence length $N_{PN}$ is the same as the dimension $N_{F_i}$ of the feature vector $F_i$. At process 605, the encoding pipeline 103 sets the phase as a function of the position of a detected person/object in the image (e.g., $\phi_i = \min(\text{sum}(x_{min}, y_{min})$ modulo $N_{PN}$, where $y_{min}$ represent the position of the detected person/object.

At process 607, the encoding pipeline 103 generates a set of pixels $P_i$ by repeating Q to match the length of $M_i$. At process 609, the encrypted mask M'$_i$ is generated based on the unencrypted mask $M_i$ and set of pixels $P_i$ (M'$_i$=$M_i$·$P_i$).

In summary, by way of example and not by way of limitation, the encryption can be based on spread spectrum encryption as described above with respect to the various embodiments process 600 where the pixel values of an unencrypted privacy mask $M_i$ 413 are spread across the color spectrum during transmission (e.g., to generate encrypted privacy mask M'$_i$ 417) and then de-spread during reception (e.g., to decode the unencrypted privacy mask $M_i$ 413 from the encrypted privacy mask M'$_i$ 417). Generally, the unencrypted privacy mask $M_i$ 413 will encode a feature vector $F_i$ 409 over a relatively narrow spectrum of colors or equivalent visual characteristics. During encryption, the encoding pipeline 103 can use sequential noise-like signal structures to spread this narrowband color signal (e.g., color frequency range) of the unencrypted privacy mask $M_i$ 413 across a larger color spectrum (e.g., larger range of color frequencies). The sequence of noise-like signal structures can be determined using a pseudorandom number generator during encryption, and the same sequence can be used during decryption of the encrypted privacy mask M'$_i$ 417.

In this way, the various embodiments described herein generate a hi-fidelity trackable privacy mask (e.g., unencrypted privacy mask $M_i$ 413 or encrypted privacy mask M'$_i$ 417) for each detected (with bounding boxes $B_i$ 407) object (e.g., person of interest or sensitive asset/object) in the image.

Returning to step 307 of the process 300, the encoding pipeline 103 (or the privacy mask encoder 109 or output circuitry) causes, at least in part, an addition of the at least one mask to the one or more detected images of the video stream as long as the one or more detected objects appear in the video stream. For example, the masks (e.g., unencrypted privacy mask $M_i$ 413 or encrypted privacy mask M'$_i$ 417) are added (in process 421) to the camera streams which may leave the premise, video source, or device along with bounding box or mask information. In the example of FIG. 4, the encrypted privacy mask M'$_i$ 417 is mapped to the pixels or image area corresponding to the bounding box $B_i$ 407 to create an image 419 with the generated encrypted privacy mask M'$_i$ 417 overlaid onto the image area delineated by the bounding box $B_i$ 407.

Figure 7:
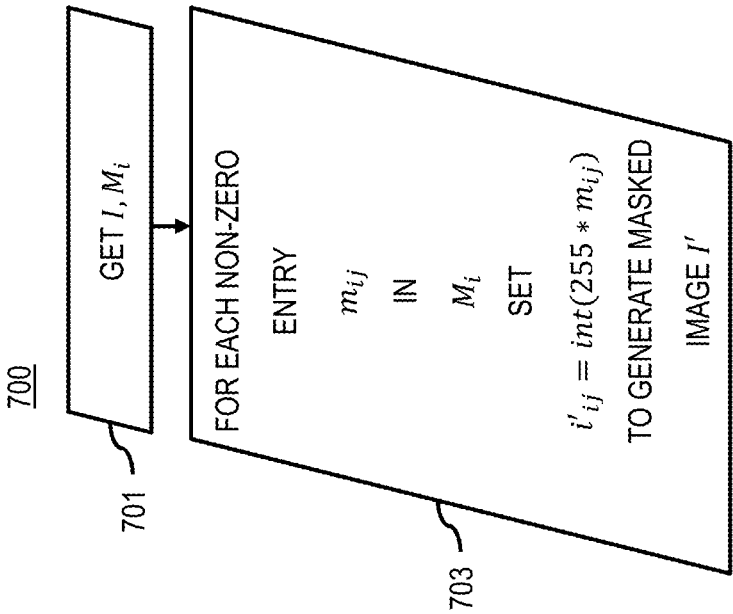
FIG. 7 is a flowchart of a process for image generation based on a mask, according to one example embodiment.

FIG. 7 is a flowchart of a process 700 for image generation based on a mask, according to one example embodiment. In various example embodiments, the encoding pipeline 103 and/or any its components (e.g., privacy mask encoder 109) may perform one or more portions of the process 700 and may be implemented in/by various means, for instance, a chip set including a processor and a memory as shown in FIG. 18 or 19, or in a circuitry, hardware, firmware, software, or in any combination thereof. In one example embodiment, the circuitry includes but is not limited to image processing circuitry, encoding circuitry, and output circuitry. As such, the system 100, the encoding pipeline 103, any of the components of the encoding pipeline 103, and/or any associated apparatus, device, circuitry, system, computer program product, and/or non-transitory computer readable medium can provide means for accomplishing various parts of the process 700, as well as means for accomplishing embodiments of other processes described herein. Although the process 700 is illustrated and described as a sequence of steps, it is contemplated that various embodiments of the process 700 may be performed in any order or combination and need not include all of the illustrated steps.

At process 701, the encoding pipeline 103 gets an image I and any associated masks $M_i$ associated with the objects detected in the image I. Then, at process 703, for each non-zero entry $m_{ij}$ in $M_i$, the encoding pipeline sets $i'_{ij}$=int $(255*m_{ij})$ to generate a masked image I'. In this example, entry $m_{ij}$ represents an element in the array in $M_i$ (e.g., a subdivision of $M_i$). The function $i'_{ij}$=int$(255*m_{ij})$ is a non-exclusive example of a function for converting the real-value (e.g., vector element value) represented in $m_{ij}$ to an image value that can be rendered in the image (e.g., a color value integer from 0-255).

Returning to step 309 of process 300, the encoding pipeline 103 (or the privacy mask encoder 109 or output circuitry) provides the video stream with the at least one mask as an output 423 to mask the one or more related objects of the video stream. In one example embodiment, the output 423 includes, at least in part, the image 419 with the privacy mask applied and mask or bounding box $B_i$ 407 information indicating the mapped location(s) and/or area(s) of the applied privacy mask(s) within the image 419. The output 423 can be transmitted over one or more channels. For example, the masked image 419 with the bounding box $B_i$ 407 information or mask information can be transmitted over any wired or wireless communication network via a first channel using any protocol or standard including but not limited to Real-time Transport Protocol (RTP), RTP Control Protocol (RTCP), Real Time Streaming Protocol (RTSP), Hypertext Transport Protocol (HTTP), Adaptive bitrate streaming protocol or equivalent, while optionally the bounding box $B_i$ 407 information or mask information (e.g., information indicating location of the mask) can be transmitted via another channel using ONVIF or equivalent.

In a use case in which the output transmission is via a single channel, the bounding box $B_i$ 407 information or mask information can be visually encoded into the output image. For example, the encoding pipeline 103 (or the privacy mask encoder 109 or output circuitry) generates at least one visual representation that indicates related mask information. The mask or bounding box $B_i$ information maps the at least one mask to the one or more images/objects. The encoding pipeline 103 (or the privacy mask encoder 109 or output circuitry) causes, at least in part, an addition of the at least one visual representation to the video stream. By way of example, the at least one visual representation includes, at least in part, a Quick Response (QR) code, a barcode, or any other type of machine readable visual representation that can be encoded with the mask and/or bounding box information, for example, a mask location, mask size and/or mask co-ordinates. Because, the bounding box $B_i$ information is encoded into pixels of the image, no additional bandwidth or resources are used for the transmission of the masked output beyond the resources normally used to transmit a video stream or image.

In yet another example embodiment, the encoding pipeline 103 (or the privacy mask encoder 109 or output circuitry) can add a visual cue representing the at least one object to the at least one mask. For example, an avatar or other unique symbol/cue can be added to the bounding box to identify a detected object as a unique object that is trackable across multiple images or frames of the video stream, for example, by a human observer or a program software/algorithm.

More specifically, in one embodiment, the feature vectors of detected persons objects can be encoded into the original images in the process 103 in the form of smart privacy masks. In one embodiment, the person/object detection can be perform using edge/cloud computing near the image capturing device (e.g., camera 101). Since the feature vectors may still contain some biometric information of persons/objects and may not be allowed to leave the premise (e.g., transmitted beyond the boundaries of the premise captured in the image), the encoding pipeline 103 can affix avatars or other symbols as visual cues and QR codes (or equivalent) for encoding bounding boxes $B_i$ to the original images for downstream analytics to be able to proceed with the sequence of masked images.

Figure 8:
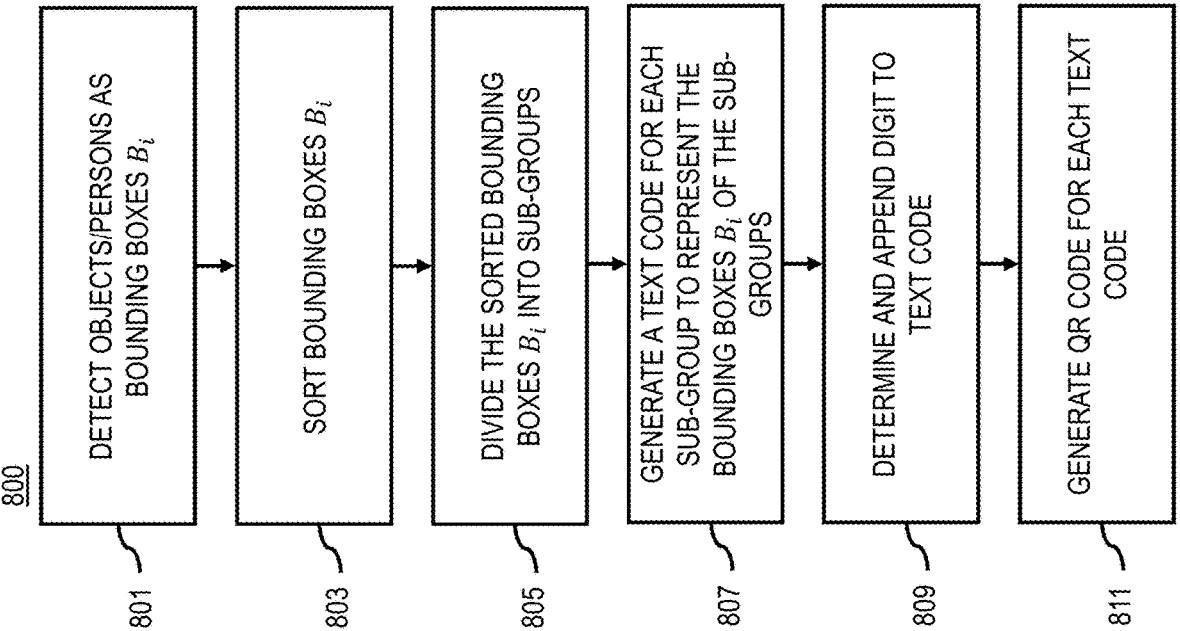
FIG. 8 is a flowchart of a process for adding visual cues or QR codes to a masked image, according to one example embodiment.

FIG. 8 is a flowchart of a process for adding one or more visual cues or QR codes to a masked image, according to one example embodiment. In various example embodiments, the encoding pipeline 103 and/or any its components (e.g., privacy mask encoder 109) may perform one or more portions of the process 800 and may be implemented in/by various means, for instance, a chip set including a processor and a memory as shown in FIG. 18 or 19, or in a circuitry, hardware, firmware, software, or in any combination thereof. In one example embodiment, the circuitry includes but is not limited to image processing circuitry, encoding circuitry, and output circuitry. As such, the system 100, the encoding pipeline 103, any of the components of the encoding pipeline 103, and/or any associated apparatus, device, circuitry, system, computer program product, and/or non-transitory computer readable medium can provide means for accomplishing various parts of the process 800, as well as means for accomplishing embodiments of other processes described herein. Although the process 800 is illustrated and described as a sequence of steps, it is contemplated that various embodiments of the process 800 may be performed in any order or combination and need not include all of the illustrated steps.

In step 801, the encoding pipeline 103 detects one or more persons or objects in the current image (e.g., as bounding boxes $B_i$ according to the various embodiments described above). In other words, the encoding pipeline 103 gets bounding boxes $B_i$ represented as $[x_i, y_i, w_i, h_i]$ where i=1, . . . , N and N is the number of bounding boxes. Each bounding box $B_i$ defined with [x,y,w,h] wherein (x,y) is the coordinates the box's left-upper corner relative to the left-upper corner of the image or frame, and w and h are the width and height of the bounding box Bi in pixels. x, y, w, and h are integers.

In step 803, the encoding pipeline 103 the sorts the bounding boxes B$_i$, for instance, in terms of total number numerical digits of each bounding box B$_i$ (or any other selected sorting parameter) in order (e.g., increasing order). For example, the total number of digits of the box [340, 230, 128, 64] is 11.

In step 805, the encoding pipeline 103 divides the N-sorted bounding boxes B$_i$ into sub-groups (e.g., four sub-groups or any other designated number) such that the total number of digits of box coordinates and sizes are roughly balanced across the sub-groups. For example, the encoding pipeline puts the first four boxes to the four sub-groups respectively. Then, the encoding pipeline sorts the four sub-groups in terms of the total number of digits in decreasing order. The next four boxes are put to the sorted sub-groups respectively. The encoding pipeline 103 re-sorts the sub-groups in decreasing order and repeats the steps until the end of the list of sorted bounding boxes B$_i$. If N≤4, there will be N sub-groups.

In step 807, the encoding pipeline 103 generates a string code, such as a text code, for each sub-group to represent the bounding boxes within the sub-group. For example, if there are two boxes [340,230,128,64] and [1090,780,250,108] in a sub-group, the text code will be, for example, "340,230, 128,64,1090,780,250,108" (e.g., a concatenation of the numbers of the boxes). In this example, the numbers are separated by a comma.

In step 809, the encoding pipeline 103 determines a digit by letting K be the actual number of sub-groups (e.g., K=1, 2, 3, or 4). The encoding pipeline 103 then appends the digit to the text code of the first sub-group, e.g., separated by a comma.

In step 811, the encoding pipeline 103 generates one or more machine-readable visual representations, such as QR codes (or equivalent code), for each text code and, for example, affixes the one or more QR codes to the four corners of the original image respectively (or any other selected location in the image). If using the four corners, the QR code for the first sub-group will be, for example, at the right-lower corner of the image or frame. In one embodiment, the size and/or resolution of the QR code is determined based on, for example, the original image size and the number of bounding boxes B$_i$ in each sub-group. By way of example, the QR code for the first sub-group of boxes can be placed in the right-lower corner of the image or frame. The rest of the QR codes can be placed at the left-lower corner, left-upper corner, and right-upper corner sequentially. Alternatively or additionally, one or more QR codes can be positioned on any of the four sides of the image of frame having rectangular form, for example, one or more QR codes can be placed attaching/touching the left edge of the rectangular, or any other edge. In some other alternative or additional examples, one or more QR codes can be freely positioned on the area of the image or frame.

In one embodiment, the QR code(s) with the bounding box or mask information for detected objects is generated for individual each image/frame of a video sequence if the bounding box changes from frame to frame. For example, if a detected object remains stationary for between frames, the corresponding bounding box is likely to be remain the same, and therefore, no new QR code is generated between the frames during which the detected object is stationary. On the other hand, if a detected object moves between frames of a video sequence, the pixel coordinates of the bounding boxes indicating the detected object will have different pixel coordinates. As a result, one or more new QR codes can be generated to indicate the different pixel coordinates of the bounding boxes between frames of a video sequence.

Figure 9:
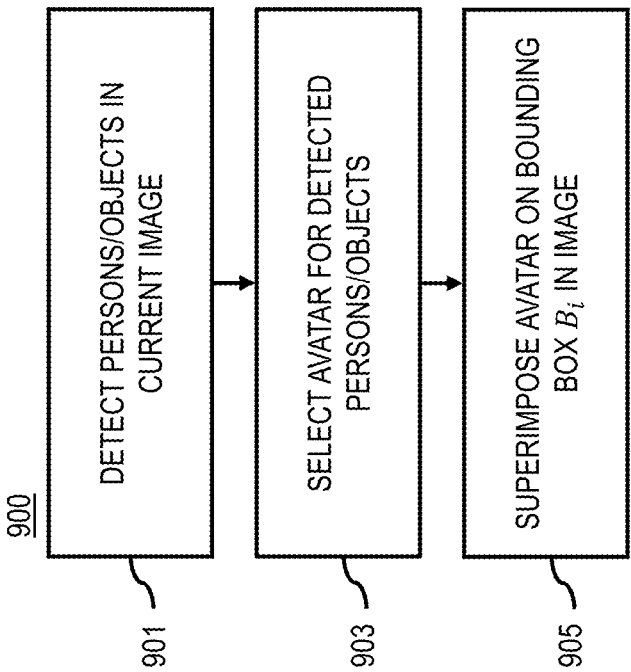
FIG. 9 is flowchart of a process for adding an avatar to a masked image, according to one example embodiment.

In some embodiments, the encoding platform can also add one or more visual cues, such as an avatar, to represent detected objects or individuals. FIG. 9 is flowchart of a process for adding an avatar to a masked image, according to one example embodiment. In various example embodiments, the encoding pipeline 103 and/or any its components (e.g., privacy mask encoder 109) may perform one or more portions of a process 900 and may be implemented in/by various means, for instance, a chip set including a processor and a memory as shown in FIG. 18 or 19, or in a circuitry, hardware, firmware, software, or in any combination thereof. In one example embodiment, the circuitry includes but is not limited to image processing circuitry, encoding circuitry, and output circuitry. As such, the system 100, the encoding pipeline 103, any of the components of the encoding pipeline 103, and/or any associated apparatus, device, circuitry, system, computer program product, and/or non-transitory computer readable medium can provide means for accomplishing various parts of the process 900, as well as means for accomplishing embodiments of other processes described herein. Although the process 900 is illustrated and described as a sequence of steps, it is contemplated that various embodiments of the process 900 may be performed in any order or combination and need not include all of the illustrated steps.

In step 901, the encoding pipeline 103 detects one or more persons or objects in the current image (e.g., based on the various embodiments described herein). For the detected persons or objects, the encoding pipeline 103 gets bounding boxes B$_i$ and feature vectors F$_i$ for each detected person/object, i=1, . . . , N where N is the number of detected persons/objects. In one embodiment, the person/object detection can be perform using edge/cloud computing near the image capturing device (e.g., camera 101).

In step 903, the encoding pipeline 103 selects an avatar based on the feature vector F$_i$ for each detected person/object. For example, the avatar can be selected from a set of pre-designed icons that each detected person/object will be associated with across different images or frames when possible. The icons, for instance, can be designed such that they are easy to detect. In some embodiments, the consistency of data association (e.g., the correspondence between avatar and detected person/object) may not be guaranteed from frame to frame. In the simplest case, the avatar can be selected based on space and time constraint in spite of the feature vectors F$_i$.

In step 905, the encoding pipeline 103 superimposes the avatars over the corresponding bounding box B$_i$ in the original image. The avatar may be resized to fit the bounding box.

In addition or alternatively, the encoding pipeline 103 (or the privacy mask encoder 109 or output circuitry) can assign a secret object identification code, a random object identification code or a combination thereof to the at least one object or associated mask. The object identification code (either secret or random) can then be used to track the object or privacy mask across different images or frames of the video stream by a program software/algorithm.

Figures 10A, 10B:
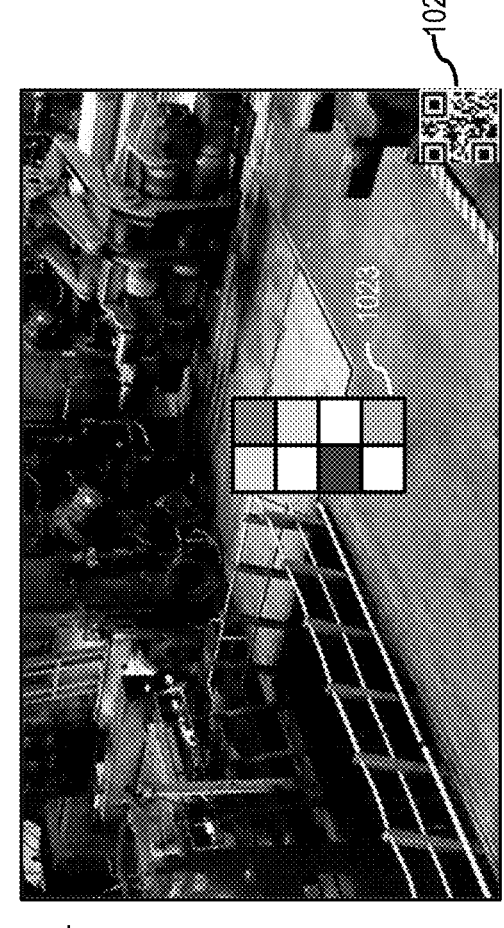
FIGS. 10A-10C are diagrams illustrating examples of videos stream with trackable privacy masks, according to various example embodiments.
Figure 10C:
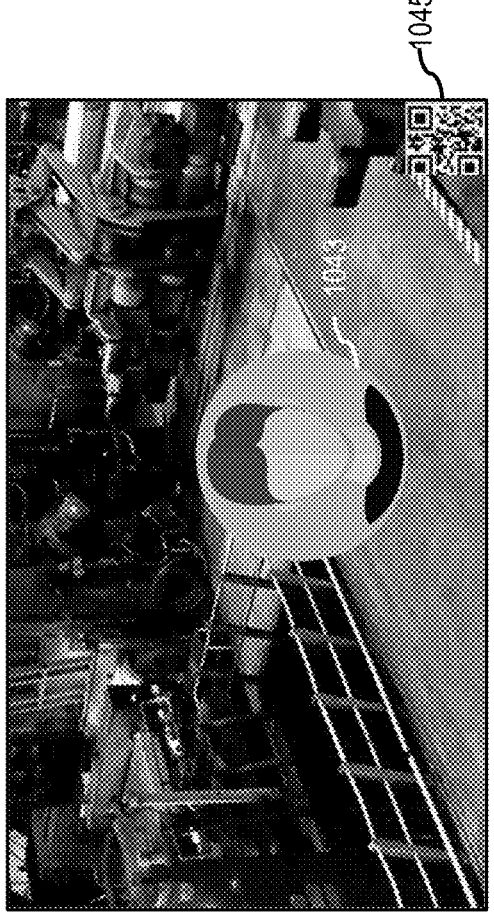

FIGS. 10A-10C are diagrams illustrating examples of videos stream with trackable privacy masks, according to various example embodiments. As shown in FIG. 10A a masked image 1001 includes a trackable privacy mask 1003 obscuring a detected object. In this example, the accompanying bounding box B$_i$ information is transmitted in via a separate channel from the video stream (e.g., via ONVIF) and so does not appear in the masked image 1001.

As shown in FIG. 10B a masked image 1021 includes a trackable privacy mask 1023 obscuring a detected object along with a QR code 1025 or any other machine readable visual representation included in the pixels of the image 1021 that encodes the bounding box $B_i$ information that indicates the location, size, co-ordinates and/or other characteristics of the trackable privacy mask 1023.

As shown in FIG. 10C, masked image 1041 includes a unique visual cue 1043 overlaid on the bounding box indicated the detected object. The unique visual cue 1043 can include unique visual features (e.g., a uniquely assigned avatar) so that the visual features of the visual cue 1043 can be used to extract a corresponding unique feature vector for tracking and analytics. The masked image 1041 also includes a QR code 1045 or any other machine readable visual representation with bounding box $B_i$ or mask information that indicates with location and/or extent of the visual cue 1043 in the masked image 1041.

Figure 11:
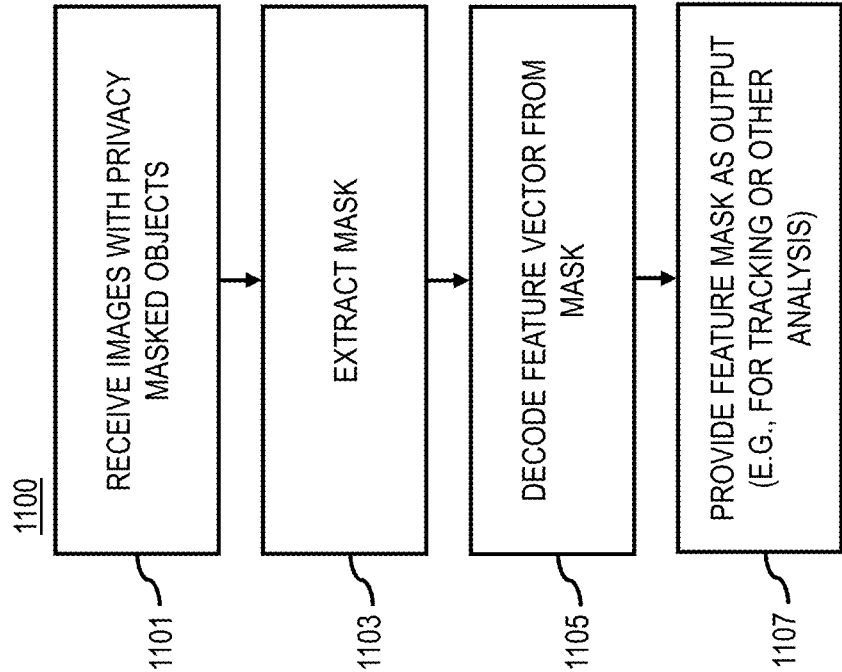
FIG. 11 is a flowchart of a process for decoding a privacy mask to generate a feature vector, according to one example embodiment.
Figure 12:
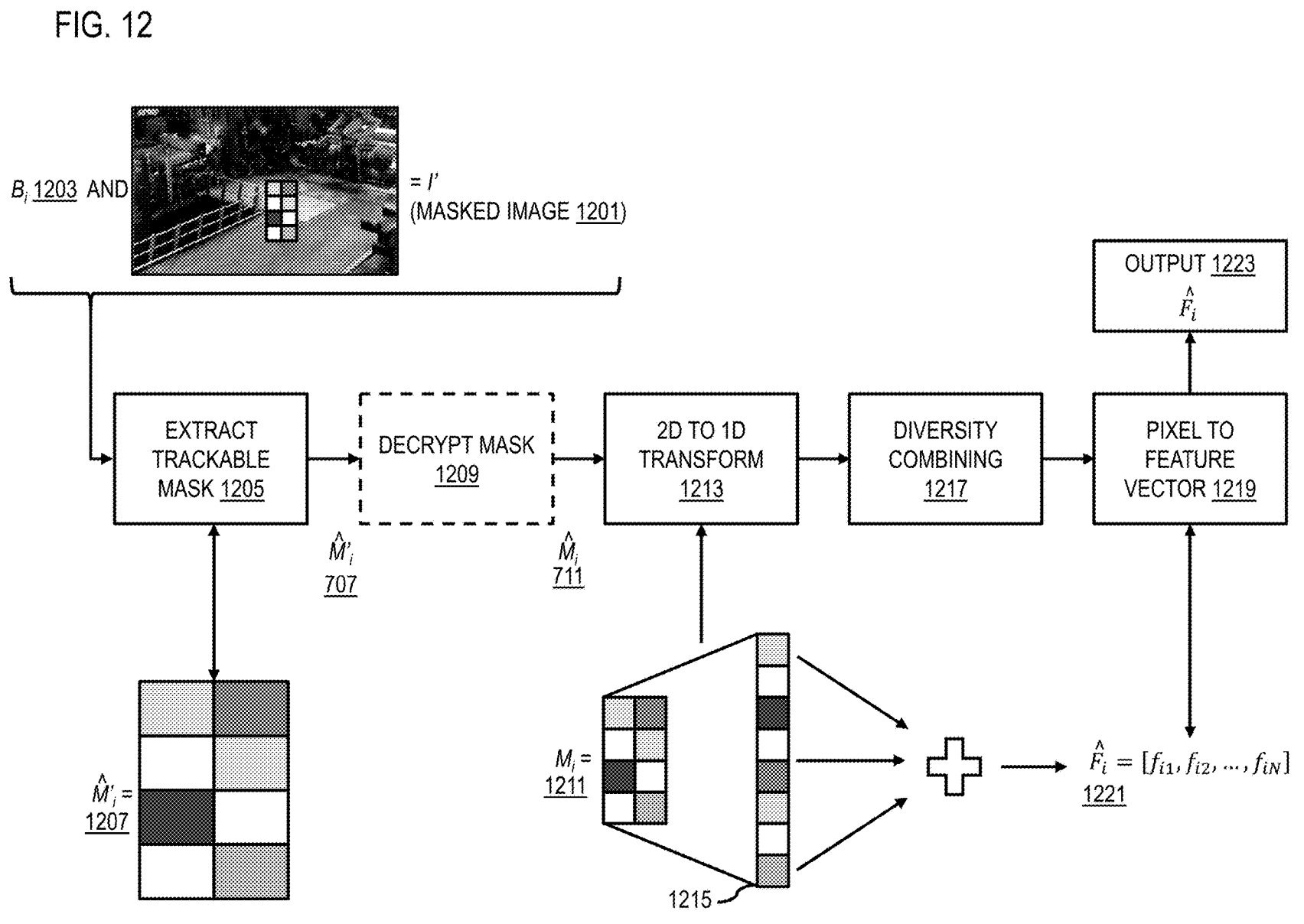

FIG. 11 is a flowchart of a process 1100 for decoding a privacy mask to generate a feature vector, according to one example embodiment. In various example embodiments, the decoding pipeline 119 and/or any its components (e.g., privacy mask decoder 121) may perform one or more portions of a process 1100 and may be implemented in/by various means, for instance, a chip set including a processor and a memory as shown in FIG. 18 or 19, or in a circuitry, hardware, firmware, software, or in any combination thereof. In one example embodiment, the circuitry includes but is not limited to image processing circuitry, decoding circuitry, and output circuitry. As such, the system 100, the decoding pipeline 119, any of the components of the decoding pipeline 119, and/or any associated apparatus, device, circuitry, system, computer program product, and/or non-transitory computer readable medium can provide means for accomplishing various parts of the process 1100, as well as means for accomplishing embodiments of other processes described herein. Although the process 1100 is illustrated and described as a sequence of steps, it is contemplated that various embodiments of the process 1100 may be performed in any order or combination and need not include all of the illustrated steps. The process 1100 is described with respect to FIG. 12 which is a diagram of a decoding pipeline for generating a privacy mask for video streams, according to one example embodiment.

In step 1101, the decoding pipeline 119 (or privacy mask decoder 121 or image processing circuitry) receives one or more images (e.g., masked image I' 701 of a video stream). The one or more images include at least one mask (e.g., generated according to the various example embodiments of process 300 of FIG. 3). The one or more images, for instance, can be received via any interface to a video source or stream including but not limited to RTSP, HTTP, or equivalent. In one example embodiment, the decoding pipeline 119 (or privacy mask decoder 121 or image processing circuitry) also receives bounding box $B_i$ or mask information 703 either directly or via QR codes embedded in the image stream (e.g., embedded in masked image I'). When delivered via QR code, a QR reader application/software in the decoding pipeline 119 can be used to scan the image for the QR code and decode the bounding box $B_i$ or mask information 703 included in the QR code.

In step 1103, the decoding pipeline 119 (or privacy mask decoder 121 or image processing circuitry) extracts the at least one mask $\widehat{M'}_t$ 1207 (e.g., trackable privacy mask generated according to the various embodiment of process 300 of FIG. 3) from the one or more images (e.g., via process 1205). As previously described, the at least one mask $\widehat{M'}_t$ 1207 encodes one or more feature vectors that represent at least one object obscured by the at least one mask $\widehat{M'}_t$ 1207. The at least one mask $\widehat{M'}_t$ 1207 is also trackable across the one or more images of the video stream based on the one or more feature vectors. Extraction, for instance, comprises identifying and extracting the pixels in the image corresponding to the mask.

In one example embodiment, the decoding pipeline 119 (or privacy mask decoder 121 or image processing circuitry) determines mask information associated with the one or more images (e.g., bounding box $B_i$ or other information indicating the pixels covered by the corresponding privacy mask). The mask information maps the at least one mask to the one or more images. Then, the extracting of the at least one mask from the one or more images is based, at least in part, on the mask information. For example, the bounding box $B_i$ or mask information can specify which image areas or pixels the decoding pipeline 119 is to extract to obtain the privacy mask.

Figure 13:
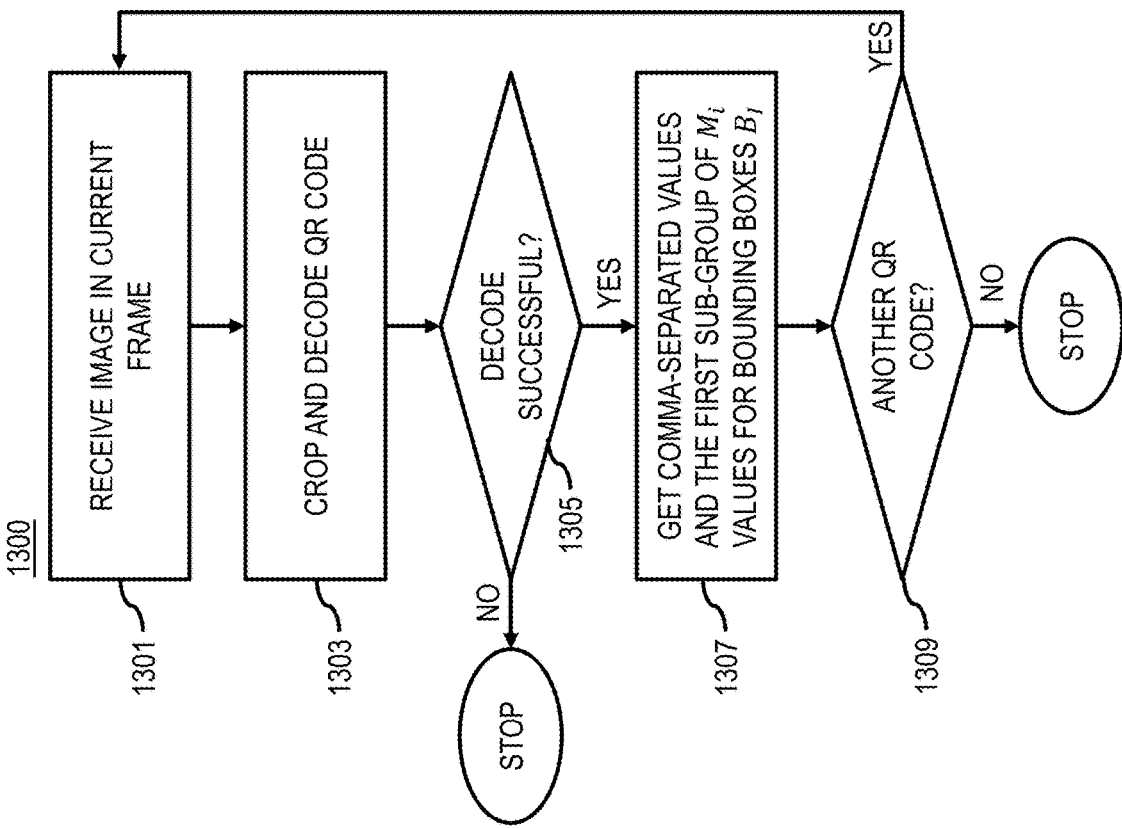
FIG. 13 is flowchart of a process for decoding QR codes from masked images, according to one example embodiment.

In one embodiment, the mask or bounding box $B_i$ information is encoded as a QR code in the image. FIG. 13 is flowchart of a process for decoding QR codes from masked images, such as the 1021 or 1041, according to one example embodiment. In various example embodiments, the decoding pipeline 119 and/or any its components (e.g., privacy mask decoder 121) may perform one or more portions of a process 1300 and may be implemented in/by various means, for instance, a chip set including a processor and a memory as shown in FIG. 18 or 19, or in a circuitry, hardware, firmware, software, or in any combination thereof. In one example embodiment, the circuitry includes but is not limited to image processing circuitry, decoding circuitry, and output circuitry. As such, the system 100, the decoding pipeline 119, any of the components of the decoding pipeline 119, and/or any associated apparatus, device, circuitry, system, computer program product, and/or non-transitory computer readable medium can provide means for accomplishing various parts of the process 1300, as well as means for accomplishing embodiments of other processes described herein. Although the process 1300 is illustrated and described as a sequence of steps, it is contemplated that various embodiments of the process 1300 may be performed in any order or combination and need not include all of the illustrated steps.

In step 1301, the decoding pipeline receives the image in the current frame. In one embodiment, the image includes one or more QR codes with mask or bounding box $B_i$ information encoded as described with respect to the various embodiments of the process of FIG. 8 above. In step 1303, the decoding pipeline 119 crops the portion of the image including the QR code (e.g., at a predesignated location such as the right-lower corner of the image for the first QR code and then subsequent corners of the image for subsequent QR codes as described, for example, by the process 800). The crop can be based on a predetermined size of the QR code or can dynamically use QR code detection to identify the portion of the image in which the QR code is embedded. The decoding pipeline 119 can then use any QR decoding mechanism to decode/extract the mask information from the cropped image.

In step 1305, if the QR decoding is not successful, the process 1300 stops. On successful decoding, in step 1307, the decoding pipeline 119 gets comma-separated values and the first sub-group of mask $M_i$ values indicating the first sub-group of bounding boxes $B_i$. In one embodiment, the data form for the bounding box values is (x, y, w, h) as described with respect to the various embodiments of the process 800 of FIG. 8.

In step 1309, the decoding pipeline 119 determines whether there is another code to crop and decode from the image. In one embodiment, this determination can be based on the K digit (e.g., from 1 to 4) encoded with the first (or any other designated) sub-group associated with a QR code (e.g., encoded according to the various embodiments of the process 800 of FIG. 8).

Figure 14:
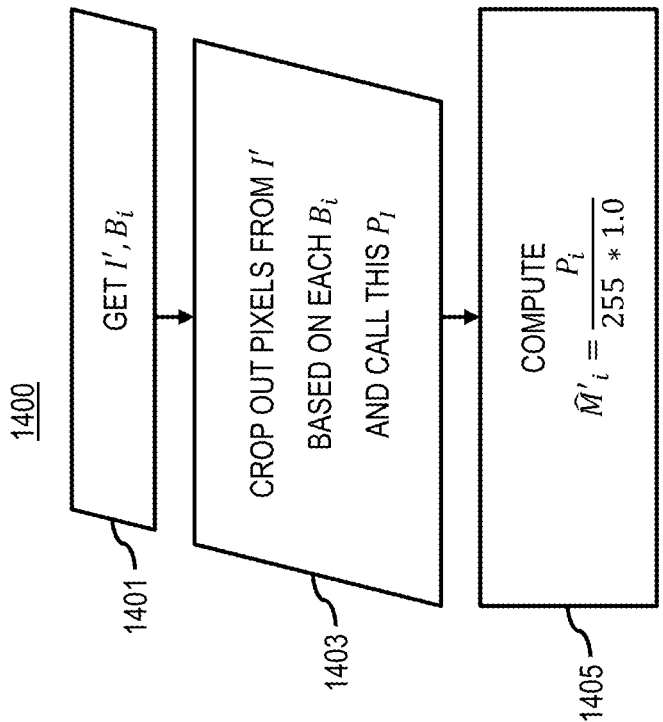
FIG. 14 is flowchart of a process for extracting pixel values from a mask, according to one example embodiment.

In one embodiment, once the bounding box or mask information is obtained, the decoding pipeline can extract the pixel values corresponding to the each mask in the image. FIG. 14 is flowchart of a process for extracting pixel values from a mask, according to one example embodiment.

FIG. 14 is flowchart of a process for extracting pixel values from a mask, according to one example embodiment. In various example embodiments, the decoding pipeline 119 and/or any its components (e.g., privacy mask decoder 121) may perform one or more portions of a process 1400 and may be implemented in/by various means, for instance, a chip set including a processor and a memory as shown in FIG. 18 or 19, or in a circuitry, hardware, firmware, software, or in any combination thereof. In one example embodiment, the circuitry includes but is not limited to image processing circuitry, decoding circuitry, and output circuitry. As such, the system 100, the decoding pipeline 119, any of the components of the decoding pipeline 119, and/or any associated apparatus, device, circuitry, system, computer program product, and/or non-transitory computer readable medium can provide means for accomplishing various parts of the process 1400, as well as means for accomplishing embodiments of other processes described herein. Although the process 1400 is illustrated and described as a sequence of steps, it is contemplated that various embodiments of the process 1400 may be performed in any order or combination and need not include all of the illustrated steps.

At process 1401, the decoding pipeline 119 gets the masked image I' along with the bounding box or mask information for the image (e.g., decoded from QR codes as described in the various embodiments above or received directly).

At process 1403, the decoding pipeline 119 crops out the pixels from the masked image I's based on the mask information for each bounding box $B_i$. The set of cropped pixels and their respective pixel values for each bounding box $B_i$ can be referred to as $P_i$.

At process 1405, the decoding pipeline 119 can then normalize the pixel values (e.g., integers) to a range (0,1) (or any other designated range) using the following example function:

$$\hat{M}'_i = \frac{P_i}{255 * 1.0}$$

where $\hat{M}'_i$ is the extracted mask that represents the normalized extracted pixel values for a given bounding box $B_i$.

In one embodiment, if the extracted mask is encrypted (e.g., encrypted privacy mask $\hat{M}'_i$ 1207), the encrypted privacy mask $\hat{M}_i$ 1211 can be decrypted using a corresponding decryption algorithm E (e.g., associated with the encryption process 415 of the encoding pipeline 103) via a decryption process 1209 to generate an unencrypted privacy mask $\hat{M}_i$ 1211. For example, if the encrypted privacy mask $\hat{M}'_i$ 1207 is encrypted by using the embodiment of spread spectrum based encryption described above with respect to process 300 of FIG. 3 and process 600 of FIG. 63, then the encrypted privacy mask $\hat{M}_i$ 1211 can be decrypted by de-spreading the color spectrum of the mask. In most cases, the privacy mask $\hat{M}_i$ 1211 will be a two-dimensional grid of cells (e.g., comprising the subdivided cells of the bounding box $B_i$). Accordingly, the decoding pipeline 119 (or privacy mask decoder 121 or image processing circuitry) can perform a two-dimensional to one-dimensional (2D-to-1D) transform 1213 of the privacy mask $\hat{M}_i$ 1211 to create a one-dimensional or linear arrangement 1215 of the grid cells of the privacy mask $\hat{M}_i$ 1211. It is contemplated that any 2D-to-1D transform can be used (e.g., concatenating columns from left to right, concatenating rows from top to bottom, etc.) provided that the same transformation is used consistently for the same detected object to facilitate consistent identification of the same object across different images.

In example embodiments in which the pixels of the privacy mask $\hat{M}_i$ 1211 are encoded based on the three channels (e.g., red, green, and blue color channels) of an image (e.g., as described in the embodiments of the process 507 of FIG. 5), the following is one but not exclusive example of multi-channel pixel decoding:

For each bounding box $B_i$ of height H and width W, crop the masked image I' and serialize the H×W pixels into 8×3×H×W bits in the same format as used by the encoding pipeline 103 at process 507 of FIG. 5

Perform decoding and decryption in the reverse order of the encryption and encoding described at process 507 of FIG. 5, e.g., including the following processes:

Extract the decoded scrambled feature bits from the 8×3×H×W bits (e.g., repetition diversity)

Perform error correction

Decrypt the scrambled feature bits (e.g., randomly scrambled)

Convert the decoded and decrypted bits to the feature vector $F_i$.

Figure 15:
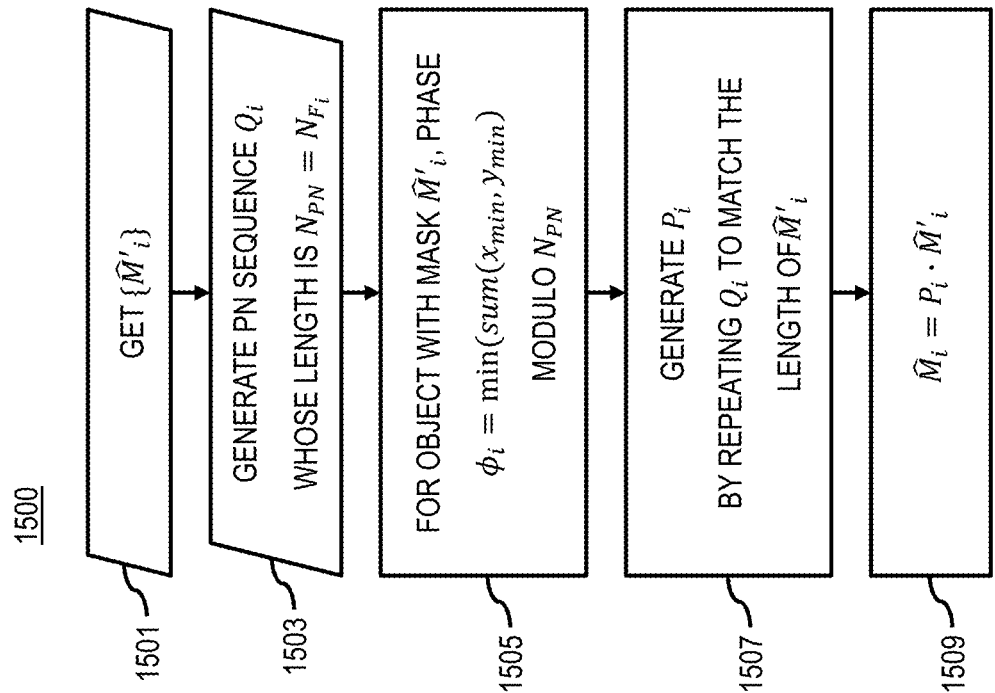
FIG. 15 is flowchart of a process for decrypting an encrypted mask, according to one example embodiment.

FIG. 15 flowchart of a process for decrypting an encrypted mask, according to one example embodiment. In various example embodiments, the decoding pipeline 119 and/or any its components (e.g., privacy mask decoder 121) may perform one or more portions of a process 1500 and may be implemented in/by various means, for instance, a chip set including a processor and a memory as shown in FIG. 18 or 19, or in a circuitry, hardware, firmware, software, or in any combination thereof. In one example embodiment, the circuitry includes but is not limited to image processing circuitry, decoding circuitry, and output circuitry. As such, the system 100, the decoding pipeline 119, any of the components of the decoding pipeline 119, and/or any associated apparatus, device, circuitry, system, computer program product, and/or non-transitory computer readable medium can provide means for accomplishing various parts of the process 1500, as well as means for accomplishing embodiments of other processes described herein. Although the process 1500 is illustrated and described as a sequence of steps, it is contemplated that various embodiments of the process 1500 may be performed in any order or combination and need not include all of the illustrated steps.

At process 1501, the decoding pipeline 119 gets or otherwise receives an encrypted mask $\hat{M}'_i$. In one embodiment, the process 1500 assumes that the encrypted mask $\hat{M}'_i$ has been encrypted using a pseudonoise (PN) encryption algorithm described with respect to the encryption process 600 of FIG. 6.

At process 1503, the decoding pipeline 119 can use a pseudonoise (PN) code sequence generator to generate a PN sequence $Q_i$ whose sequence length $N_{PN}$ is the same as the dimension $N_{F_i}$ of the feature vector $F_j$. At process 1505, for the object with the encrypted mask $\hat{M}'_i$, the decoding pipeline 119 sets the phase as a function of the position of a detected person/object in the image (e.g., $\phi_i = \min(\text{sum}(x_{min}, y_{min})$ modulo $N_{PN}$, where $x_{min}, y_{min}$ represent the position of the detected person/object.

At process 1507, the decoding pipeline 119 generates the set of pixels $P_i$ by repeating $Q_i$ to match the length of $\hat{M}'_i$. At process 1509, the decrypted mask $\hat{M}_i$ is generated based on the set of pixels $P_i$ and the encrypted mask $\hat{M}'_i$ ($\hat{M}_i = P_i \cdot \hat{M}'_i$). In one example embodiment, the decoding pipeline 119 (or privacy mask decoder 121 or image processing circuitry) can also perform error correction on the extracted privacy mask $\hat{M}_i$ 1211 or its 1D transformation to reduce noise of diversity caused by differences in the detected objects visual features across different images or frames of the video stream and/or to protect against noise introduced within an image during transmission/encoding or reception/decoding. In one embodiment, error correction is provided by repeating the same feature vector across the pixels in a bounding box (e.g., repeating feature vector $F_i$ 409). One example of error correction includes but is not limited to a diversity combining process 1217. By way of example, diversity combining can be applied to combine multiple instances of encoded visual feature values of the grid cells of multiple privacy masks $\hat{M}_i$ 1211 across multiple images to generate an improved representation of the visual features of the privacy mask $\hat{M}_i$ 1211. It is contemplated that any diversity combining technique or equivalent error correction process can be used according to the various embodiments described herein.

Returning to step 1105 of process 1100, the decoding pipeline 119 (or privacy mask decoder 121 or decoding circuitry) decodes the one or more feature vectors from the at least one mask (e.g., or 1D transformation 1215 of the mask). In other words, the extracted privacy mask is decoded to generate unique feature vectors for the person/objects that were masked in the original image. In one example embodiment, decoding comprises using respective functions (e.g., $f_{i1} \ldots f_{iN}$) applied to the visual representation (e.g., color, shading, etc.) for each grid cell to determine a real-value of an element of the decoded feature vector $\hat{F}_i$ 1221. In other words, the values of the respective elements of the feature vector $\hat{F}_i$ 1221 corresponding to each cell or subdivision of the mask are decoded based on the visual characteristic or feature encoded into each grid cell (e.g., color spectrum encoding as described with respect to the various embodiments of the process 300 of FIG. 3) in a pixel-to-feature vector process 1219. For example, the color or shading of each grid cell can be converted to a numeric value representing an element of the decoded feature vector $\hat{F}_i$ 1221 using respective functions $f_{i1} \ldots f_{iN}$. The respective function values of the cells are aggregated to generate the decoded feature vector $\hat{F}_i$ 1221 (e.g., $\hat{F}_i = [f_{i1}, f_{i2}, \ldots, f_{iN}]$).

Figure 16:
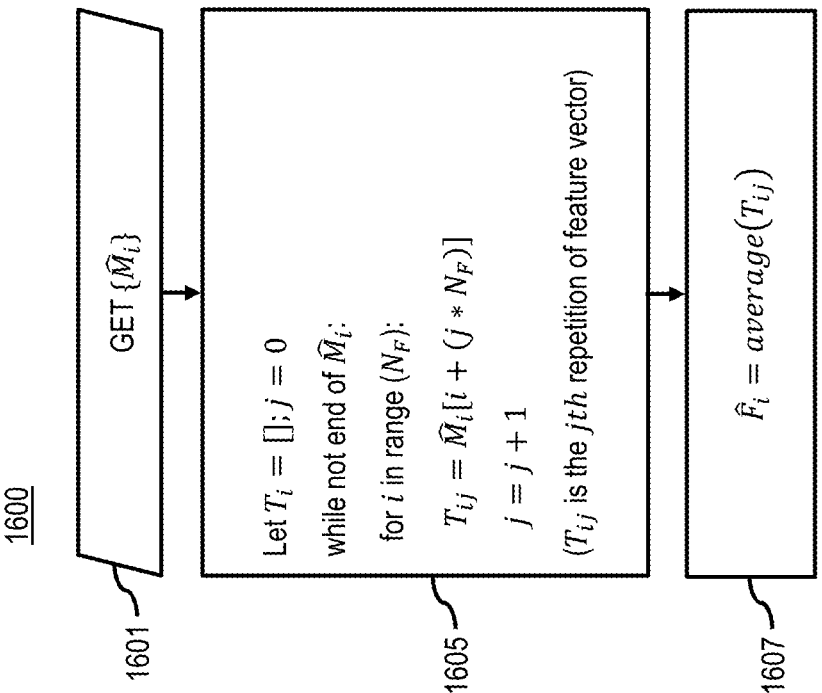
FIG. 16 is flowchart of a process for extracting a feature vector from a decrypted mask, according to one example embodiment.

FIG. 16 is flowchart of a process for extracting a feature vector from a decrypted mask, according to one example embodiment. In various example embodiments, the decoding pipeline 119 and/or any its components (e.g., privacy mask decoder 121) may perform one or more portions of a process 1600 and may be implemented in/by various means, for instance, a chip set including a processor and a memory as shown in FIG. 18 or 19 or in a circuitry, hardware, firmware, software, or in any combination thereof. In one example embodiment, the circuitry includes but is not limited to image processing circuitry, decoding circuitry, and output circuitry. As such, the system 100, the decoding pipeline 119, any of the components of the decoding pipeline 119, and/or any associated apparatus, device, circuitry, system, computer program product, and/or non-transitory computer readable medium can provide means for accomplishing various parts of the process 1600, as well as means for accomplishing embodiments of other processes described herein. Although the process 1600 is illustrated and described as a sequence of steps, it is contemplated that various embodiments of the process 1600 may be performed in any order or combination and need not include all of the illustrated steps.

At process 1501, the decoding platform 119 obtains the decrypted mask $\{\hat{M}_i\}$ comprising one or more repetitions of the feature vector $F_i$ or elements of the feature vector from i to NF (the total number of subdivisions, features, or repetitions).

At process 1505, the set of extracted feature vectors and/or feature vector elements is determined as $T_{ij}$ with j being the jth repetition of the feature vector and/or feature vector elements. In one embodiment, each instance of $T_{ij}$ is computed as:

$$T_{ij} = \hat{M}_i[i + (j * N_F)]$$

At process 1507, the decoding platform 119 computes the extracted feature vector $\hat{F}_i = \text{average}(T_{ij})$.

In one embodiment, if there was also transmission of visual cues (e.g., avatars), then this information is also decoded (e.g., by extracting a unique feature vector corresponding to the visual characteristics of the visual cue alone or in combination with any trackable privacy mask that may be visible in the masked image).

Returning to step 1107 of process 1100, the decoding pipeline 119 (or privacy mask decoder 121 or output circuitry) provides the one or more feature vectors (e.g., decoded feature vector $\hat{F}_i$ 1221) as an output 1223. This decoded feature vector $\hat{F}_i$ 1221, for instance, uniquely identifies the detected object between different images or frames of a video stream. The extracted feature vectors $\hat{F}_i$ 1221 can then be used for various tracking applications and/or analytics without compromising on the visual privacy of the individuals or objects.

Examples of this tracking and/or analytics include applications such as but not limited to surveillance, security, automation, traffic monitoring, product scanning, shopping scanning, indoor warehouse scanning, and/or similar applications for quick response. By way of example, the decoding pipeline 119 (or privacy mask decoder 121 or output circuitry) causes, at least in part, a tracking, an analysis, or a combination thereof of the at least one object based, at least in part, on the one or more decoded feature vectors $\hat{F}_i$ 1221.

In one example embodiment, the decoding pipeline 119 (or privacy mask decoder 121 or output circuitry) extracts at least one visual cue associated with the at least one mask in the one or more images. Then, the tracking, the analysis, or a combination thereof is based, at least in part, on the at least one visual cue. In other words, a unique feature vector $\hat{F}_i$ 1221 can be decoded from the visual cue and/or underlying trackable privacy mask (if visible in the image and not fully obscured by the visual cue) to uniquely identify the detected object.

In one example embodiment, the tracking, the analysis, or a combination thereof is based, at least in part, on a secret object identification code, a random object identification code, or a combination thereof assigned to the at least one object. For example, when a trackable privacy mask is decoded from an image, an object identification code (e.g., secret or random) can be assigned to mask or object. The three objects or masks with the same identification code can be matched or tracked across the different images.

One example application of the feature vector decoded from privacy mask generated according to the various embodiments described herein includes visual tracking. Visual tracking can be defined, for example, as the problem of estimating the paths or trajectories of one or more objects in an image plane as they move around a scene in a sequence of consecutive images or frames (i.e., videos). The goal of the task is to keep track of each object's motion, positioning, and occlusion. In some use cases, the one or more objects can be selected manually, automatically by defined/selected one or more object types or categories, or in combination. One example embodiment of an approach to a visual object tracking is based on, for instance, the tracking-by-detection paradigm. By way of example, there are two main steps in this approach:

(1) Step one is to detect each object of interest (e.g., find their locations and sizes in the image plane), and then (2) Step two is to associate the detections of the objects from frame to frame (e.g., set up the object-to-object correspondences between frames).

With the great success of the deep learning based neural networks in object and feature detection/extraction, step one of the tracking-by-detection approach can use deep neural networks to detect and segment the objects depicted in the images of a video or image sequence. By way of example, it is contemplated that any type of neural network (or equivalent algorithm) available/capable for object detection (e.g., providing a bounding box around a detected object) and instance segmentation (e.g., providing contours around a detected object) can be used for tracking-by-detection. In one example embodiment, one or more frames of the video are processed by the object tracking system (e.g., the tracking-by-detection system) to identify object as a detection (e.g., a bounding box around the object as depicted in the image frame). In one example embodiment, after detection, the bounding box image area is overlaid with the privacy mask of the various embodiments described herein and then associate the privacy masks with the same or substantially the same (e.g., vector values matching to within a target range or tolerance) across different frames of the video.

Figure 17:
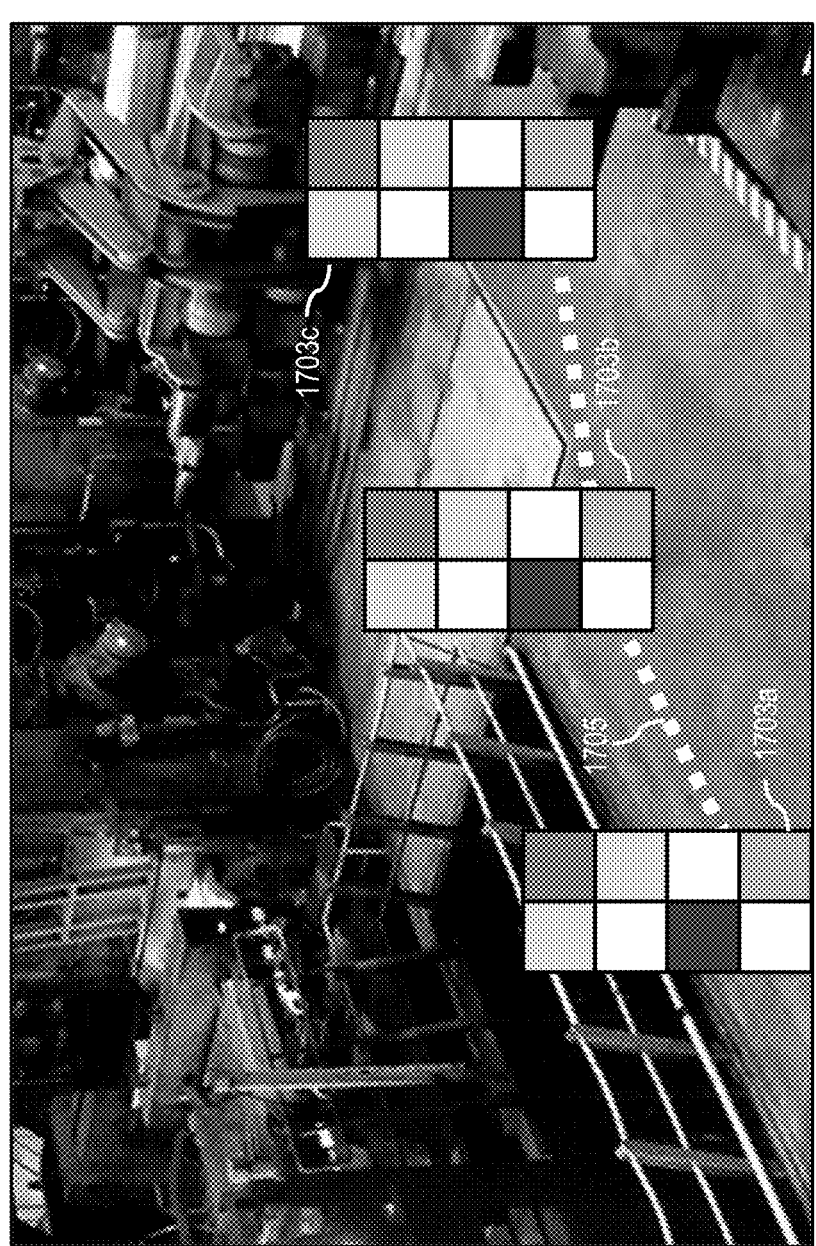
FIG. 17 is a diagram illustrating an example of tracking a person of interest using a trackable privacy mask, according to one example embodiment.

FIG. 17 is a diagram illustrating an example of tracking a person of interest using a trackable privacy mask, according to one example embodiment. In this example, a composite image 1701 combines the person detection results from three sequential images of a video stream. A first trackable privacy mask 1703a is generated based on the visual features of a first detection of individual that has been masked for privacy. A second trackable privacy mask 1703b is generated from a subsequent image in the video stream, and a third trackable privacy mask 1703c is generated from yet another subsequent image. As shown, each of the trackable privacy masks 1703a-1703c has grid cells with an identical arrangement of cell shading and/or coloring, and thus the feature vectors extracted from each trackable privacy mask 1703a-1703c would have matching feature vectors. This matching or consistent feature vector indicates that the object or individual masked by each privacy mask 1703a-1703c is likely to be the same. Accordingly, a tracking algorithm can be applied to determine the path 1705 taken by the object through the environment over time. In this case, tracking is made possible without exposing the identity of the tracked individual based on the privacy masks 1703a-1703c having matched unique visual features (and resulting feature vectors) to indicate that the object detected in the three sequential images. It is noted that the three sequential images are shown in composite in this example for illustrative convenience. However, it is contemplated that each image is processed individually to generate each privacy mask 1703a-1703c and provided to the object tracking algorithm for analysis.

Returning to FIG. 1, in one example embodiment, the video sources 101 can include one or more devices or apparatuses, for example, standalone cameras, User Equipment (UE) devices, IoT devices, and/or any other device capable of acquiring sensor information from which objects can be masked according to the various example embodiments described herein. In another example, the encoding pipeline 103 and/or decoding pipeline 119 can be implemented, respectively, in the standalone camera, User Equipment (UE) device, IoT device, and/or any other device capable of running the pipelines 103 and/or 119. Such devices can include but are not limited to a mobile device, a smartphone, smart glasses, a smart visor, a mobile communication device, an infotainment device, a navigation device, a smart watch, etc. or any combination thereof. By way of example, the UEs can be any type of mobile terminal, fixed terminal, or portable terminal including a mobile handset, station, unit, device, wearables (e.g., smart glasses, augmented reality (AR) glasses, smart visor or shield), mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, including the accessories and peripherals of these devices, or any combination thereof. It is also contemplated that a UE can support any type of interface to the user (such as "wearable" circuitry, etc.). In one instance, an IoT device may include one or more remote sensor devices, a wearable, a UE, or a combination thereof. Also, the UEs may be configured to access the communications network by way of any known or still developing communication protocols. In one example embodiment, privacy preserving masking function (e.g., encoding and/or decoding) can be implemented in any of the above-mentioned device or apparatus.

In one example, the one or more devices or apparatuses, for example, standalone cameras, User Equipment (UE) devices, IoT devices include one or more device sensors (e.g., a front facing camera, a rear facing camera, digital image sensors, LiDAR (light detection and ranging) sensor, global positioning system (GPS) sensors, sound sensors, radars, microphones, height or elevation sensors, accelerometers, tilt sensors, moisture/humidity sensors, pressure sensors, temperature sensor, barometer, NFC sensors, wireless network sensors, etc.) and clients (e.g., mapping applications, navigation applications, image processing applications, augmented reality applications, image/video application, modeling application, communication applications, etc.). In one example, GPS sensors can enable the UEs to obtain geographic coordinates from one or more satellites for determining current or live location and time. Further, a user location within an area may be determined by a triangulation system such as A-GPS (Assisted-GPS), Cell of Origin, or other location extrapolation technologies when cellular or network signals are available.

In one example embodiment, the encoding pipeline 103 and/or decoding pipeline 119 of the system 100 can perform functions related to providing a privacy mask for video streams as discussed with respect to the various embodiments described herein. In one instance, the encoding pipeline 103 and/or decoding pipeline 119 of the system 100 can be implemented in a standalone server computer or a component of another device with connectivity to the communications network 117. For example, the component can be part of an edge computing network where remote computing devices are installed within proximity of a geographic area of interest, one or more assets/objects/individuals to be monitored, or a combination thereof.

In one instance, the system 100 and/or any of its components 101-125 can include one or more neural networks or other machine learning algorithms/systems to process images/frames of an input (e.g., a video stream or multiple static/still images, or serial or satellite imagery) (e.g., using an image segmentation algorithm) to generate labels for pixels of the input images. In one instance, the neural network of the DNN-based object detection and feature extraction is a convolutional neural network (CNN) which consists of multiple layers of collections of one or more neurons (which are configured to process a portion of an input data).

In one example, the system 100 and/or any of its components 101-125 has connectivity to one or more services platforms and/or one or more software applications that provides one or more services that can use the output (e.g., privacy masks, associated bounding boxes, or other related mask information) of the 100. By way of example, the connectivity can be internal connection within the apparatuses and/or happen over the communications network 117. By way of example, the one or more services may also include tracking services, data analytics services, mapping services, navigation services, emergency response services, notification services, social networking services, content (e.g., audio, video, images, etc.) provisioning services, application services, storage services, contextual information determination services, augmented reality (AR) services, location-based services, information-based services (e.g., weather, news, etc.), etc. or any combination thereof.

In one example, one or more cameras 101, IoT devices, drones, and/or UEs may be configured with various sensors for acquiring and/or generating sensor data for real-time. For example, the sensors can capture one or more images of a geographic area and/or any other sensor data (e.g., LiDAR point clouds, infrared scans, radar scans, etc.) that can be used for real-time object tracking or analytics based on privacy masks generated according to the embodiments described herein.

In one example, the components of the system 100 may communicate over a communications network 117 that includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless communication network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one example, the system 100 or any of its components may be a platform with multiple interconnected components (e.g., a distributed framework). The system 100 and/or any of its components may include multiple servers, intelligent networking devices, computing devices, components, and corresponding software for real-time object tracking. In addition, it is noted that the system 100 or any of its components may be a separate entity, a part of the one or more services, a part of a services platform, or included within devices, e.g., camera 101, UEs, IoT devices, or divided between any other components.

By way of example, the component of the system 100 can communicate with each other and other components external to the system 100 using well known, new or still developing protocols. In this context, a protocol includes a set of rules defining how the network nodes within the communications network interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The processes described herein for providing a privacy mask for video streams may be advantageously implemented via software, hardware (e.g., general processor, Digital Signal Processing (DSP) chip, an Application Specific Integrated Circuit (ASIC), Field Programmable Gate Arrays (FPGAs), etc.), firmware, circuitry, or a combination thereof. Such exemplary hardware for performing the described functions is detailed below.

FIG. 18 illustrates a computer system 1800 upon which various example embodiments of the invention may be implemented. Computer system 1800, such as any of the elements 101-125, is programmed (e.g., via computer program code or instructions) to provide a privacy mask for video streams as described herein and includes a communication mechanism such as a bus 1810 for passing information between other internal and external components of the computer system 1800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

The bus 1810 includes one or more parallel conductors of information so that information is transferred quickly among devices coupled to the bus 1810. One or more processors 1802 for processing information are coupled with the bus 1810.

One or more processors 1802 perform a set of operations on information as specified by one or more computer program code related to providing a privacy mask for video streams. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1810 and placing information on the bus 1810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1800 also includes one or more memories 1804 coupled to the bus 1810. The memory 1804, such as a random access memory (RAM) or other dynamic storage device, stores information including processor instructions for providing a privacy mask for video streams. Dynamic memory allows information stored therein to be changed by the computer system 1800. RAM allows a unit of information stored at a location called a memory address to be stored and retrieved independently of information at neighboring addresses. The memory 1804 is also used by the processor 1802 to store temporary values during execution of processor instructions. The computer system 1800 also includes one or more read only memories (ROM) 1806 or other static storage devices coupled to the bus 1810 for storing static information, including instructions, that is not changed by the computer system 1800. Some memory is composed of volatile storage that loses the information stored thereon when power is lost. Also coupled to the bus 1810 is one or more non-volatile (persistent) storage devices 1808, such as a magnetic disk, optical disk, or flash card, for storing information, including instructions, that persists even when the computer system 1800 is turned off or otherwise loses power.

Information, including instructions for providing a privacy mask for video streams, is provided to the bus 1810 for use by the processor from an external input device 1812, such as a keyboard containing alphanumeric keys operated by a human user, or a sensor. A sensor detects conditions in its vicinity and transforms those detections into physical expression compatible with the measurable phenomenon used to represent information in the computer system 1800. Other external devices coupled to the bus 1810, used primarily for interacting with humans, include a display device 1814, such as a cathode ray tube (CRT) or a liquid crystal display (LCD), or plasma screen or printer for presenting text or images, and a pointing device 1816, such as a mouse or a trackball or cursor direction keys, or motion sensor, for controlling a position of a small cursor image presented on the display 1814 and issuing commands associated with graphical elements presented on the display 1814. In some embodiments, for example, in embodiments in which the computer system 1800 performs all functions automatically without human input, one or more of external input device 1812, display device 1814 and pointing device 1816 is omitted.

In the illustrated embodiment, special purpose hardware, such as one or more application specific integrated circuits (ASIC) 1820, is coupled to the bus 1810. The special purpose hardware is configured to perform operations not performed by the processor 1802 quickly enough for special purposes. Examples of application specific ICs include graphics accelerator cards for generating images for the display 1814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 1800 also includes one or more instances of a communications interface 1870 coupled to the bus 1810. The communication interface 1870 provides a one-way or two-way communication coupling to a variety of external devices that operate with their own processors, such as printers, scanners, and external disks. In general, the coupling is with a network link 1878 that is connected to a local network 1880 to which a variety of external devices with their own processors are connected. For example, the communication interface 1870 may be a parallel port or a serial port or a universal serial bus (USB) port on a personal computer. In some embodiments, the communications interface 1870 is an integrated services digital network (ISDN) card or a digital subscriber line (DSL) card or a telephone modem that provides an information communication connection to a corresponding type of telephone line. In some embodiments, the communication interface 1870 is a cable modem that converts signals on the bus 1810 into signals for a communication connection over a coaxial cable or into optical signals for a communication connection over a fiber optic cable. As another example, the communications interface 1870 may be a local area network (LAN) card to provide a data communication connection to a compatible LAN, such as Ethernet. Wireless links may also be implemented. For the wireless links, the communications interface 1870 sends or receives or both sends and receives electrical, acoustic, or electromagnetic signals, including infrared and optical signals, that carry information streams, such as digital data. For example, in wireless handheld devices, such as mobile telephones like cell phones, the communications interface 1870 includes a radio band electromagnetic transmitter and receiver called a radio transceiver. In certain embodiments, the communications interface 1870 enables connection to a communication network for providing a privacy mask for video streams.

The term non-transitory computer-readable medium is used herein to refer to any medium that participates in providing information to the processor 1802, including instructions for execution. The term "non-transitory," as used herein, is a limitation of the medium itself (i.e., tangible, not a signal) as opposed to a limitation on data storage persistency (e.g., RAM vs. ROM). Such a medium may take many forms, including, but not limited to, non-volatile media, volatile media, and transmission media. Non-volatile media include, for example, optical or magnetic disks, such as storage device 1808. Volatile media include, for example, dynamic memory 1804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

The network link 1878 typically provides information communication using transmission media through one or more networks to other devices that use or process the information. For example, the network link 1878 may provide a connection through local network 1880 to a host computer 1882 or to an equipment 1884 operated by an Internet Service Provider (ISP). The ISP equipment 1884 in turn provides data communication services through the public, world-wide packet-switching communication network of networks now commonly referred to as the Internet 1890.

A computer called a server host or a server 1892 connected to the Internet hosts a process that provides a service in response to information received over the Internet. For example, the server host 1892 hosts a process that provides information representing video data for presentation at the display 1814. It is contemplated that the components of system can be deployed in various configurations within other computer systems, e.g., the host 1882 and the server 1892.

FIG. 19 illustrates a chip set 1900 upon which an embodiment of the invention may be implemented. The chip set 1900, implemented in any of the elements 101-125, is programmed to provide a privacy mask for video streams as described herein and includes, for instance, the processor and memory components described with respect to FIG. 18 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1900 includes a communication mechanism such as a bus 1901 for passing information among the components of the chip set 1900. One or more processors 1903 have connectivity to the bus 1901 to execute instructions and process information stored in, for example, a memory 1905. The processor 1903 may include one or more processing cores with each core configured to perform independently. A multi-core processor enables multiprocessing within a single physical package. Examples of the multi-core processor include two, four, eight, or greater numbers of processing cores. Alternatively or in addition, the processor 1903 may include one or more microprocessors configured in tandem via the bus 1901 to enable independent execution of instructions, pipelining, and multithreading. The processor 1903 may also be accompanied with one or more specialized components to perform certain processing functions and tasks such as one or more digital signal processors (DSP) 1907, or one or more application-specific integrated circuits (ASIC) 1909. A DSP 1907 typically is configured to process real-world signals (e.g., sound) in real time independently of the processor 1903. Similarly, an ASIC 1909 can be configured to performed specialized functions not easily performed by a general purposed processor. Other specialized components to aid in performing the inventive functions described herein comprises one or more field programmable gate arrays (FPGA) (not shown), one or more controllers (not shown), or one or more other special-purpose computer chips.

The processor 1903 and accompanying components have connectivity to the memory 1905 via the bus 1901. The memory 1905 includes both dynamic memory (e.g., RAM, magnetic disk, writable optical disk, etc.) and static memory (e.g., ROM, CD-ROM, etc.) for storing executable instructions that when executed perform the inventive steps described herein to provide a privacy mask for video streams. The memory 1905 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus comprising:
   at least one processor; and
   at least one memory storing instructions that, when executed by the at least one processor, cause the apparatus at least to perform:
      process one or more images of a video stream to detect at least one object;

determine one or more feature vectors from a plurality of pixels of the one or more images that correspond to the at least one detected object, wherein each feature vector comprises a plurality of feature vector elements;

encode the one or more feature vectors into at least one mask that obscures the at least one object in the one or more images, wherein the at least one mask is trackable across the one or more images of the video stream based on the one or more feature vectors, wherein the encoding is further caused to subdivide an image area corresponding to the at least one object into a plurality of cells forming the at least one mask, and replace pixels of each of the plurality of the cells with a visual representation determined by a function of a corresponding one of the plurality of feature vector elements;

cause, at least in part, an addition of the at least one mask and at least one machine readable code to the one or more images of the video stream, wherein the at least one machine readable code indicates a location of the at least one mask in the one or more images; and provide the video stream with the at least one mask as an output.

2. The apparatus of claim 1, wherein the apparatus is caused to further perform:

generate at least one visual representation that indicates mask information, wherein the mask information maps the at least one mask to the one or more images; and cause, at least in part, an addition of the least one visual representation to the video stream.

3. The apparatus of claim 1, wherein the at least one machine readable code is a Quick Response (QR) code, wherein the QR code is added to the one or more images at another location than the location of the at least one mask.

4. The apparatus of claim 1, wherein the apparatus is caused to further perform:

cause, at least in part, an encryption of the one or more encoded feature vectors to generate the at least one mask.

5. The apparatus of claim 1, wherein the one or more feature vectors are encoded based, at least in part, on color spectrum based feature vector coding.

6. The apparatus of claim 1, wherein the apparatus is caused to further perform:

add a visual cue representing the at least one object to the at least one mask.

7. The apparatus of claim 1, wherein the apparatus is caused to further perform:

assign a secret object identification code, a random object identification code, a visual cue, or a combination thereof to the at least one object.

8. A method comprising:

processing one or more images of a video stream to detect at least one object;

determining one or more feature vectors from a plurality of pixels of the one or more images that correspond to the at least one detected object, wherein each feature vector comprises a plurality of feature vector elements;

encoding the one or more feature vectors into at least one mask that obscures the at least one object in the one or more images, wherein the at least one mask is trackable across the one or more images of the video stream based on the one or more feature vectors, wherein the encoding is further caused to subdivide an image area corresponding to the at least one object into a plurality of cells forming the at least one mask, and replace pixels of each of the plurality of the cells with a visual representation determined by a function of a corresponding one of the plurality of feature vector elements;

causing, at least in part, an addition of the at least one mask and at least one machine readable code to the one or more images of the video stream, wherein the at least one machine readable code indicates a location of the at least one mask in the one or more images; and providing the video stream with the at least one mask as an output.

9. The method of claim 8, further comprising:

generating at least one visual representation that indicates mask information, wherein the mask information maps the at least one mask to one or more images; and causing, at least in part, an addition of the least one visual representation to the video stream.

* * * * *